US009366452B2

(12) United States Patent
Takenaka et al.

(10) Patent No.: US 9,366,452 B2
(45) Date of Patent: Jun. 14, 2016

(54) AIR-CONDITIONING APPARATUS WITH PRIMARY AND SECONDARY HEAT EXCHANGE CYCLES

(75) Inventors: Naofumi Takenaka, Chiyoda-ku (JP);
Shinichi Wakamoto, Chiyoda-ku (JP);
Koji Yamashita, Chiyoda-ku (JP);
Hiroyuki Morimoto, Chiyoda-ku (JP);
Yusuke Shimazu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 419 days.

(21) Appl. No.: 13/266,247

(22) PCT Filed: Jul. 10, 2009

(86) PCT No.: PCT/JP2009/062576
§ 371 (c)(1),
(2), (4) Date: Oct. 26, 2011

(87) PCT Pub. No.: WO2010/131378
PCT Pub. Date: Nov. 18, 2010

(65) Prior Publication Data
US 2012/0042674 A1 Feb. 23, 2012

(30) Foreign Application Priority Data

May 12, 2009 (JP) ................................. 2009-115778

(51) Int. Cl.
*F24F 11/00* (2006.01)
*F24F 3/06* (2006.01)
(Continued)

(52) U.S. Cl.
CPC .................. *F24F 11/006* (2013.01); *F24F 3/06* (2013.01); *F25B 49/02* (2013.01); *F24F 11/0012* (2013.01); *F24F 2011/0013* (2013.01); *F24F 2011/0045* (2013.01); *F25B 9/008* (2013.01);
(Continued)

(58) Field of Classification Search
CPC ........... F25B 25/005; F25B 2313/0231; F25B 2313/0233
USPC ............................ 62/159, 179, 180, 185, 201
See application file for complete search history.

(56) References Cited

U.S. PATENT DOCUMENTS 4,375,753 A * 3/1983 Imasu et al. .................... 62/160
5,213,619 A * 5/1993 Jackson et al. .................... 134/1
(Continued)

FOREIGN PATENT DOCUMENTS

JP 62 084241 4/1987
JP 03017475 * 1/1991
(Continued)

OTHER PUBLICATIONS

Machine Translation of JP2004-293999.*
(Continued)

*Primary Examiner* — Jonathan Bradford
(74) *Attorney, Agent, or Firm* — Oblon, McClelland, Maier & Neustadt, L.L.P.

(57) ABSTRACT

An air-conditioning apparatus capable of achieving enhancement of the system COP while suppressing product cost. The air-conditioning apparatus controls the difference between the temperatures of brine at a position before and at a position after an indoor heat exchanger or at a position before and at a position after an intermediate heat exchanger to be a preset target value and to be larger at the time of a heating operation than at the time of a cooling operation.

12 Claims, 14 Drawing Sheets

(51) Int. Cl.
*F25B 49/02* (2006.01)
*F25B 13/00* (2006.01)
*F25B 25/00* (2006.01)
*F25B 9/00* (2006.01)

(52) U.S. Cl.
CPC .............. *F25B 13/00* (2013.01); *F25B 25/005* (2013.01); *F25B 2309/061* (2013.01); *F25B 2313/0233* (2013.01); *F25B 2313/0272* (2013.01); *F25B 2313/0314* (2013.01); *F25B 2500/222* (2013.01); *F25B 2600/021* (2013.01); *F25B 2600/13* (2013.01); *F25B 2700/1931* (2013.01); *F25B 2700/1933* (2013.01); *F25B 2700/2104* (2013.01); *F25B 2700/2106* (2013.01); *Y02B 30/741* (2013.01); *Y02B 30/745* (2013.01)

(56) References Cited

U.S. PATENT DOCUMENTS

| | | | | |
|---|---|---|---|---|
| 5,921,092 | A * | 7/1999 | Behr | A47F 3/0482 62/155 |
| 6,032,473 | A * | 3/2000 | Morimoto et al. | 62/205 |
| 6,347,528 | B1 * | 2/2002 | Iritani et al. | 62/324.6 |
| 6,893,619 | B1 * | 5/2005 | James et al. | 422/198 |
| 7,124,595 | B2 * | 10/2006 | Park et al. | 62/199 |
| 2001/0000050 | A1 * | 3/2001 | Okazaki et al. | 62/149 |
| 2002/0014085 | A1 * | 2/2002 | Sakakibara et al. | 62/201 |
| 2003/0115896 | A1 * | 6/2003 | Caesar et al. | 62/228.3 |
| 2005/0155361 | A1 * | 7/2005 | Jung | F25B 13/00 62/159 |
| 2006/0080989 | A1 * | 4/2006 | Aoki et al. | 62/324.4 |
| 2006/0107683 | A1 * | 5/2006 | Song et al. | 62/324.1 |
| 2006/0191286 | A1 * | 8/2006 | Park et al. | 62/434 |
| 2007/0107451 | A1 * | 5/2007 | Sakurai et al. | 62/228.3 |
| 2007/0125106 | A1 * | 6/2007 | Ishikawa et al. | 62/183 |
| 2008/0016907 | A1 * | 1/2008 | Barclay et al. | 62/612 |
| 2009/0165873 | A1 * | 7/2009 | Chordia et al. | 137/597 |
| 2010/0198416 | A1 * | 8/2010 | Kasahara et al. | 700/282 |
| 2011/0088421 | A1 | 4/2011 | Wakamoto et al. | |

FOREIGN PATENT DOCUMENTS

| | | | |
|---|---|---|---|
| JP | 3-148564 A | 6/1991 | |
| JP | 05-280818 | * 10/1993 | .............. F25B 13/00 |
| JP | 2000 130877 | 5/2000 | |
| JP | 2001 133090 | 5/2001 | |
| JP | 2003-21411 | 1/2003 | |
| JP | 2003 322388 | 11/2003 | |
| JP | 2003 343936 | 12/2003 | |
| JP | 2004-293999 | 10/2004 | |
| JP | 2004-293999 | * 12/2004 | |
| JP | 2005 069554 | 3/2005 | |
| JP | 2005 188812 | 7/2005 | |
| JP | 2005 351587 | 12/2005 | |
| JP | 2006 003079 | 1/2006 | |

OTHER PUBLICATIONS

English Translation of Aoyama JP 03017475.*
Chinese Office Action issued Jul. 19, 2013, in China Patent Application No. 200980159215.5 (with Partial English translation).
International Search Report Issued Oct. 13, 2009 in PCT/JP09/062576 Filed Jul. 10, 2009.
Japanese Office Action issued Dec. 4, 2012, in Japan Patent Application No. 2011-513205 (with English translation).
U.S. Appl. No. 13/266,182, filed Oct. 25, 2011, Wakamoto, et al.
Office Action issued on Jul. 2, 2013 in the corresponding Japanese Patent Application No. 2011-513205 (with English Translation).

* cited by examiner

FIG. 1

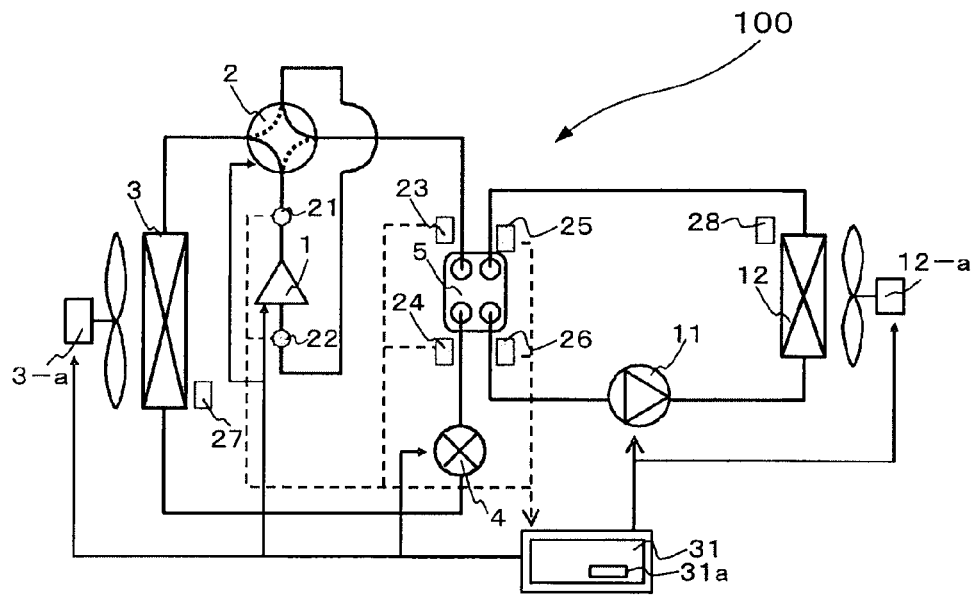

FIG. 2

METHOD OF CONTROL OF EACH ACTUATOR (COOLING OPERATION)

| COMPRESSOR FREQUENCY [Hz] | OUTDOOR FAN SPEED [-] | OPENING DEGREE OF EXPANSION DEVICE [-] | DRIVING OF PUMP | INDOOR FAN SPEED [-] |
|---|---|---|---|---|
| SUCTION PRESSURE | DISCHARGE PRESSURE | INTERMEDIATE HEAT EXCHANGER SH | TEMPERATURE DIFFERENCE BETWEEN THE INLET PORT AND THE OUTLET PORT OF THE INTERMEDIATE HEAT EXCHANGER (BRINE) | REMOTE-CONTROLLER SET VALUE |

FIG. 3

METHOD OF CONTROL OF EACH ACTUATOR (HEATING OPERATION)

| COMPRESSOR FREQUENCY [Hz] | OUTDOOR FAN SPEED [-] | OPENING DEGREE OF EXPANSION DEVICE [-] | DRIVING OF PUMP | INDOOR FAN SPEED [-] |
|---|---|---|---|---|
| DISCHARGE PRESSURE | SUCTION PRESSURE | INTERMEDIATE HEAT EXCHANGER SC | TEMPERATURE DIFFERENCE BETWEEN THE INLET PORT AND THE OUTLET PORT OF THE INTERMEDIATE HEAT EXCHANGER (BRINE) | REMOTE-CONTROLLER SET VALUE |

AIR-CONDITIONING APPARATUS WITH PRIMARY AND SECONDARY HEAT EXCHANGE CYCLES

TECHNICAL FIELD

The present invention relates to an air-conditioning apparatus using a refrigeration cycle and, more specifically, to an air-conditioning apparatus for heat transport, which transports cooling energy and heating energy generated in the refrigeration cycle to a use side heat exchanger using a heat medium.

BACKGROUND ART

In the related art, there is an air-conditioning apparatus for heat transport in which a refrigeration cycle is constituted by connecting a compressor, a heat source side heat exchanger, an expansion valve, and an intermediate heat exchanger in sequence via pipes, and in which a pump, a use side heat exchanger, and the intermediate heat exchanger are connected in series, thereby performing heat transport so as to transport cooling energy and heating energy generated in the refrigeration cycle to the use side heat exchanger using a heat medium such as water or brine (for example, see Patent Literatures 1 to 3). The air-conditioning apparatus as described above has an advantage in that the amount of refrigerant enclosed therein can be reduced in comparison with a normal direct expansion air conditioner. Also, in a normal air-conditioning apparatus, if refrigerant leaks indoors, the refrigerant can have adverse effects on the human body due to its toxicity, combustibility, and the like, whereas in the air-conditioning apparatus described above, there is no risk of any indoor leak because no refrigerant piping is provided indoors.

In an air-conditioning apparatus described in Patent Literature 1, stable air conditioning is achieved by controlling the flow rate of heat source water flowing into a water heat exchanger in association with the fluctuations in the inlet water temperature of the heat source water. In this air-conditioning apparatus (cold/hot water coil air conditioner), the temperature of the heat source water is controlled to change on the order of 5 degrees C. for both a cooling operation and a heating operation. For example, the temperature of the heat source water is changed from 7-10 degrees C. to 12-15 degrees C. during the cooling operation, and the temperature of the heat source water is changed from 40-45 degrees C. to 35-40 degrees C. during the heating operation.

Also, an air-conditioning apparatus described in Patent Literature 2 generates a counter flow of fluids (for example, refrigerant, water, air, and the like) passing through a main (water) heat exchanger or a use side (indoor) heat exchanger and sets the difference between the inlet and outlet temperatures of water to be 10 degrees C. or larger, thereby achieving reduction of the size of the air-conditioning unit and reduction of the transport energy. In addition, an air-conditioning apparatus described in Patent Literature 3 measures electrical inputs of a compressor and a pump and controls the operation of the pump on the basis of a rotation speed when the sum of the electrical inputs of the compressor and the pump becomes small.

CITATION LIST

Patent Literature

PTL 1: Japanese Unexamined Patent Application Publication No. 2005-69554 (pp. 5 to 7, FIG. 1 to FIG. 3)
PTL 2: Japanese Unexamined Patent Application Publication No. 2000-130877 (p. 6, FIG. 4 to FIG. 6)
PTL 3: Japanese Unexamined Patent Application Publication No. 2006-3079 (pp. 5 to 7, FIG. 1 to FIG. 3)

SUMMARY OF INVENTION

Technical Problem

In an air-conditioning apparatus in which heat is exchanged via a heat medium (for example, water, brine, and the like) between refrigerant in the refrigeration cycle and indoor air, air conditioning performance is lower than that of a normal direct expansion air conditioner. In order to improve and enhance such performance, enhancement of the entire system performance (system COP) is required by improving the performance of the refrigeration cycle and reducing the driving power of the heat transporting medium (heat medium). Further, it is not desirable in terms of product manufacturing to mount an instrument such as a wattmeter which results in an increase in cost, and optimization of control with a simple method is in demand.

In the air-conditioning apparatus described in Patent Literature 1, a flow control valve provided on the heat source water cycle side is controlled on the basis of the inlet temperature of the heat source water and the outlet temperature of the heat source water, but control of an actuator on the heat source side (for example, a compressor, an expansion device, an outdoor fan, and the like) is not considered, and here a challenge lies in enhancing the performance of the entire system. In the air-conditioning apparatus described in Patent Literature 2, the difference between the inlet and outlet temperatures of the water is set to 10 degrees C. or larger by generating the counter flow of fluids passing through the heat exchanger, but there still lies a challenge in obtaining finer temperature control, and furthermore control of the actuator on the heat source side at that time is not given in detail. In the air-conditioning apparatus described in Patent Literature 3, the operation of the pump is controlled on the basis of the electrical inputs of the compressor and the pump, but the temperature control is not clear.

The invention was made to overcome the above-described challenges, and an object is to provide an air-conditioning apparatus which can improve system COP while suppressing product cost.

Solution to Problem

An air-conditioning apparatus according to the invention includes: a primary-side cycle including a compressor, a heat source side heat exchanger, an expansion device, and at least one intermediate heat exchanger, which are interconnected, and allowing a primary-side heat transfer medium to circulate; and a secondary-side cycle including a pump, a use side heat exchanger, and the intermediate heat exchanger, which are connected, and allowing a secondary-side heat transfer medium to circulate, the intermediate heat exchanger exchanging heat between the primary-side heat transfer medium and the secondary-side heat transfer medium, wherein the air-conditioning apparatus further includes control means setting a target value of the difference between the temperatures of the secondary-side heat transfer medium at a position before and at a position after the use side heat exchanger or at a position before and at a position after the intermediate heat exchanger so as to be larger at the time of a heating operation than at the time of a cooling operation, and for controlling the flow rate of the secondary-side heat transfer medium before entering and after leaving the use side heat exchanger or flowing in the intermediate heat exchanger.

Advantageous Effects of Invention

According to the air-conditioning apparatus of the invention, since the difference between the temperatures of the secondary-side heat transfer medium at a position before and at a position after the use side heat exchanger or at a position before and at a position after the intermediate heat exchanger is controlled to be a preset target value and to be larger at the time of the heating operation than at the time of the cooling operation, the actuator can be controlled adequately in accordance with each operation mode, namely the cooling operation or the heating operation, and operation in a state of high COP can be performed.

BRIEF DESCRIPTION OF DRAWINGS

FIG. 1 is a refrigerant cycle chart showing a configuration of a refrigerant cycle in an air-conditioning apparatus according to Embodiment 1.

FIG. 2 is a table showing examples of control of each actuator at the time of a cooling operation of the air-conditioning apparatus according to Embodiment 1.

FIG. 3 is a table showing examples of control of each actuator at the time of a heating operation of the air-conditioning apparatus according to Embodiment 1.

DESCRIPTION OF EMBODIMENTS

Figure 4:
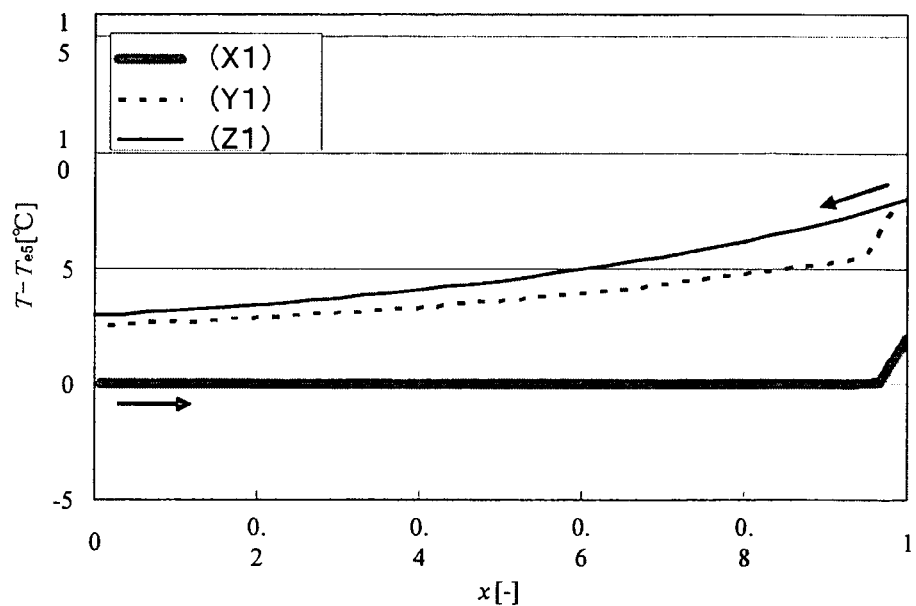
FIG. 4 is a graph showing the temperature distributions of refrigerant and brine in an intermediate heat exchanger at the time of the cooling operation of the air-conditioning apparatus according to Embodiment 1.

Referring to the drawings, an embodiment of the invention will be described below.
Embodiment 1

FIG. 1 is a refrigerant cycle chart showing a configuration of a refrigerant cycle in an air-conditioning apparatus 100 according to Embodiment 1 of the invention. A cycle configuration and an operation of the air-conditioning apparatus 100 will be described with reference to FIG. 1. This air-conditioning apparatus 100 is capable of cooling or heating by using refrigeration cycles (a primary-side cycle and a secondary-side cycle) in which refrigerants (a primary-side heat transfer medium and a secondary-side heat transfer medium) circulate, In the drawings shown below, including FIG. 1, the dimensional relationships of the respective components may be different from those in the actual ones.

As shown in FIG. 1, the air-conditioning apparatus 100 includes a compressor 1, a four-way valve 2, an outdoor heat exchanger (heat source side heat exchanger) 3, an outdoor fan 3-*a*, an expansion device 4, an intermediate heat exchanger 5, a pump 11, an indoor heat exchanger (use side heat exchanger) 12, and an indoor fan 12-*a*. The compressor 1, the four-way valve 2, the outdoor heat exchanger 3, the expansion device 4, and the intermediate heat exchanger 5 are connected in sequence via pipes, constituting a primary-side cycle serving as a refrigeration cycle in which a primary-heat transfer medium circulates. Also, the pump 11, the indoor heat exchanger 12, and the intermediate heat exchanger 5 are connected in sequence via pipes, constituting a secondary-side cycle serving as a refrigeration cycle in which a secondary-side heat transfer medium (hereinafter, referred to as brine) circulates.

As the primary-side heat transfer medium (hereinafter, referred to as refrigerant), for example, fluorocarbon refrigerant such as R410A refrigerant, hydrocarbon refrigerant such as propane refrigerant, or natural refrigerant such as carbon dioxide refrigerant may be used. Refrigerant having a global warming potential smaller than that of R407C or R410A (for example, refrigerant including tetrafluoropropene as the main ingredient), and the like may be used as the refrigerant.

As the secondary-side heat transfer refrigerant, for example, brine (antifreeze solution), water, a mixed solution of brine and water, a mixed solution including water and an additive having a high anti-corrosive effect, and the like may be used.

The compressor 1 sucks the refrigerant and compresses the refrigerant into a high-temperature and high-pressure state, and may be constituted by, for example, a capacity-controllable inverter compressor, or the like. The four-way valve 2 functions as a refrigerant flow direction switching means, and switches between the flow of the refrigerant at the time of the heating operation and the flow of the refrigerant at the time of the cooling operation. The outdoor heat exchanger 3 functions as an evaporator at the time of the heating operation and functions as a condenser at the time of the cooling operation, exchanges heat between air supplied from the outdoor fan 3-a and the refrigerant, and evaporates and gasifies or condenses and liquefies the refrigerant. If refrigerant (for example, carbon dioxide or the like) that radiates heat while its temperature is dropping when the refrigerant is in a supercritical state is used as the refrigerant, the above-described outdoor heat exchanger 3 operates as a heat radiator.

The outdoor fan 3-a is provided in the vicinity of the outdoor heat exchanger 3 and supplies air to the outdoor heat exchanger 3. The expansion device 4 functions as a reducing valve and an expansion valve, and expands the refrigerant by reducing the pressure. The expansion device 4 may be constituted by a device which can variably control an opening-degree, for example, an electronic expansion valve or the like. The intermediate heat exchanger 5 is constituted by, for example, a double tube heat exchanger, a plate heat exchanger, a microchannel water heat exchanger, or the like, exchanges heat between the refrigerant circulating in the primary-side cycle and the brine circulating in the secondary-side cycle, and performs heat transport so as to transport cooling energy and heating energy generated in the primary-side cycle to the indoor heat exchanger 12.

The pump 11 sucks the brine, pressurizes the brine, and causes the brine to circulate in the secondary-side cycle. The pump 11 may be constituted by, for example, a capacity-controllable inverter pump or the like. The indoor heat exchanger 12 is supplied with hot water at the time of the heating operation and with cold water at the time of the cooling operation and exchanges heat between air supplied from the indoor fan 12-a and the brine, thereby generating heated air or cooled air to be supplied to an air conditioning area. The indoor fan 12-a is provided in the vicinity of the indoor heat exchanger 12, supplies air to this indoor heat exchanger 12, and blows out the air-conditioned air generated in the indoor heat exchanger 12 to the air conditioning area.

Also, the air-conditioning apparatus 100 is provided with various detectors (a discharge pressure detector 21, a suction pressure detector 22, a first refrigerant temperature detector 23, a second refrigerant temperature detector 24, a first brine temperature detector 25, a second brine temperature detector 26, an outdoor temperature detector 27, and an indoor temperature detector 28). In addition, the air-conditioning apparatus 100 is provided with a control means 31. This control means 31 controls running of the compressor 1, switching of the four-way valve 2, running of a fan motor of the outdoor fan 3-a, an opening-degree of the expansion device 4, running of the pump 11, and running of a fan motor of the indoor fan 12-a on the basis of the information (refrigerant pressure information, refrigerant temperature information, brine temperature information, outdoor temperature information, and indoor temperature information) detected by the respective detectors. The control means 31 includes a memory 31a in which a function and the like for determining each control value are stored.

The discharge pressure detector 21 is provided in a discharge pipe of the compressor 1, and measures the discharge pressure (high pressure) of the refrigerant discharged from the compressor 1. The suction pressure detector 22 is provided in a suction pipe of the compressor 1, and measures the suction pressure (low pressure) of the refrigerant sucked into the compressor 1. The first refrigerant temperature detector 23 is provided in a gas-side pipe of the intermediate heat exchanger 5 (a pipe connecting the four-way valve 2 and the intermediate heat exchanger 5), and measures the temperature of the refrigerant flowing in this pipe. The second refrigerant temperature detector 24 is provided in a liquid-side pipe of the intermediate heat exchanger 5 (a pipe connecting the intermediate heat exchanger 5 and the expansion device 4), and measures the temperature of the refrigerant flowing in this pipe.

The first brine temperature detector 25 is provided in a brine pipe on the upstream side of the intermediate heat exchanger 5 (a pipe connecting the indoor heat exchanger 12 and the intermediate heat exchanger 5), and measures the temperature of the brine flowing in this pipe. The second brine temperature detector 26 is provided in a brine pipe on the downstream side of the intermediate heat exchanger 5 (a pipe connecting the intermediate heat exchanger 5 and the pump 11), and measures the temperature of the brine flowing in this pipe. The outdoor temperature detector 27 is provided on the air side of the outdoor heat exchanger 3, and measures the temperature of air to be supplied to the outdoor heat exchanger 3. The indoor temperature detector 28 is provided on the air side of the indoor heat exchanger 12, and measures, for example, a suction air temperature as a representative temperature on the air side.

The flows of the refrigerant and the brine at the time of various operations executed by the air-conditioning apparatus 100 will be described along with the method of controlling various elemental devices.

[Cooling Operation]

When performing the cooling operation, the four-way valve 2 is switched so as to allow the refrigerant discharged from the compressor 1 to flow into the outdoor heat exchanger 3 (as shown by solid lines in FIG. 1). In this state, the operation of the compressor 1 is started.

Low-temperature and low-pressure refrigerant is compressed by the compressor 1, and is discharged as high-temperature and high-pressure gas refrigerant. The high-temperature and high-pressure gas refrigerant discharged from the compressor 1 flows into the outdoor heat exchanger 3 via the four-way valve 2. In the outdoor heat exchanger 3, the refrigerant is cooled while outdoor air is heated, and becomes medium-temperature and high-pressure liquid refrigerant. The pressure of the medium-temperature and high-pressure liquid refrigerant flowing from the outdoor heat exchanger 3 is reduced in the expansion device 4, and low-temperature and low-pressure refrigerant is obtained. The low-temperature and low-pressure refrigerant flows into the intermediate heat exchanger 5, and is heated while the brine flowing into the intermediate heat exchanger 5 is cooled. Thus, low-temperature and low-pressure gas refrigerant is obtained. The gas refrigerant is sucked into the compressor 1 via the four-way valve 2.

In contrast, the brine cooled in the intermediate heat exchanger 5 is driven by the pump 11 to flow into the indoor heat exchanger 12. In the indoor heat exchanger 12, the brine is heated while indoor air is cooled, and returns to the intermediate heat exchanger 5. Cooling air is generated by the brine cooling the indoor air, and the cooling air is supplied to the air conditioning area by the indoor fan 12-*a*, whereby the cooling operation is performed.

FIG. 2 shows, in a table, examples of the frequency of the compressor 1, running of the fan motor of the outdoor fan 3-*a*, the opening-degree of the expansion device 4, running of the pump 11, and running of the fan motor of the indoor fan 12-*a*, which are controlled by the control means 31 at the time of the cooling operation. As shown in FIG. 2, the frequency of the compressor 1 is controlled according to the suction pressure, the fan speed of the outdoor fan 3-*a* is controlled according to the discharge pressure, the opening-degree of the expansion device 4 is controlled according to a degree of superheat SH at the outlet of the intermediate heat exchanger 5, the running frequency (voltage) of the pump 11 is controlled according to the difference between the inlet and outlet temperatures of the brine in the intermediate heat exchanger 5, and the fan speed of the indoor fan 12-*a* is controlled to match a remote-controller set value, for example, full speed.

Here, the degree of superheat SH is calculated, for example, from the difference between the refrigerant temperature detected by the first refrigerant temperature detector 23 of the intermediate heat exchanger 5 and the low-pressure saturation temperature of the refrigerant obtained from the pressure value detected by the suction pressure detector 22. The target value of the suction pressure is determined from the number of operating indoor units or the temperature difference between the temperature detected by the indoor temperature detector 28 provided indoors and the set temperature as a load of cooling. In addition, the target value of the discharge pressure is determined from the outside temperature detected by the outdoor temperature detector 27. The target value of the difference between the inlet and outlet temperatures of the brine in the intermediate heat exchanger 5 is determined as the target value determined depending on the operation mode, described later.

While the expansion device 4, which is controlled by the degree of superheat SH at the outlet of the intermediate heat exchanger 5, is given as an example, the expansion device 4 may be controlled on the basis of the difference between the refrigerant temperature obtained by a refrigerant temperature detector mounted in the liquid-side pipe of the outdoor unit and the saturation temperature of the refrigerant obtained from the discharge pressure (a degree of supercooling SC at the outlet of the outdoor unit). Even in this case, the state of the cycle can be controlled adequately. Also, in Embodiment 1, while a case where running of the pump 11 is controlled by the difference between the inlet and outlet temperatures of the brine in the intermediate heat exchanger 5 is given as an example, it is also possible to control the running of the pump 11 on the basis of the temperature difference between temperatures obtained by temperature detectors mounted in the brine pipes located before and after the indoor heat exchanger 12. Furthermore, while a case where the difference between the inlet and outlet temperatures of the brine is controlled by the running frequency (voltage) of the pump 11 is given as an example, similar effects can be obtained even when the difference between the inlet and outlet temperatures of the brine is controlled by the flow control of the brine using a flow control valve installed in the secondary-side cycle.

Also, when the running of the pump 11 is controlled only with ON-OFF control, a similar effect can be obtained even by connecting a by-pass pipe extending from the outlet of the pump 11 to the inlet of the pump 11 and the flow control valve, controlling the flow rate of the brine in the intermediate heat exchanger 5 or the indoor heat exchanger 12 by using the flow control valve, and controlling the difference between the inlet and outlet temperatures of the brine.

[Heating Operation]

When performing the heating operation, the four-way valve 2 is switched so as to allow the refrigerant discharged from the compressor 1 to flow into the intermediate heat exchanger 5 (as shown by broken lines in FIG. 1). In this state, the operation of the compressor 1 is started.

Low-temperature and low-pressure refrigerant is compressed by the compressor 1, and is discharged as high-temperature and high-pressure gas refrigerant. The high-temperature and high-pressure gas refrigerant discharged from the compressor 1 flows into the intermediate heat exchanger 5 via the four-way valve 2. In the intermediate heat exchanger 5, the refrigerant is cooled while the brine flowing into the intermediate heat exchanger 5 is heated, and becomes medium-temperature and high-pressure liquid refrigerant. The pressure of the medium-temperature and high-pressure liquid refrigerant flowing from the intermediate heat exchanger 5 is reduced in the expansion device 4, and low-temperature and low-pressure refrigerant is obtained. The low-temperature and low-pressure refrigerant flows into the outdoor heat exchanger 3, and is heated while the outdoor air is cooled. Thus, low-temperature and low-pressure gas refrigerant is obtained. The gas refrigerant is sucked into the compressor 1 via the four-way valve 2.

In contrast, the brine heated in the intermediate heat exchanger 5 is driven by the pump 11 to flow into the indoor heat exchanger 12. In the indoor heat exchanger 12, the brine is cooled while the indoor air is heated, and returns to the intermediate heat exchanger 5. Heating air is generated by the brine heating the indoor air, and the cooling and heating air is supplied to the air conditioning area by the indoor fan 12-*a*, whereby the heating operation is performed.

FIG. 3 shows, in a table, examples of the frequency of the compressor 1, running of the fan motor of the outdoor fan 3-*a*, the opening-degree of the expansion device 4, running of the pump 11, and running of the fan motor of the indoor fan 12-*a*, which are controlled by the control means 31 at the time of the heating operation. As shown in FIG. 3, the frequency of the compressor 1 is controlled according to the discharge pressure, the fan speed of the outdoor fan 3-*a* is controlled according to the suction pressure, the opening-degree of the expansion device 4 is controlled according to the degree of supercooling SC at the outlet of the intermediate heat exchanger 5, the running frequency (voltage) of the pump 11 is controlled according to the difference between the inlet and outlet temperatures of the brine in the intermediate heat exchanger 5, and the fan speed of the indoor fan 12-*a* is controlled to match the remote-controller set value, for example, full speed. It is also possible to add a flow control valve separately to control the difference between the inlet and outlet temperatures of the brine for the heating operation as well.

Here, the degree of supercooling SC is calculated, for example, from the difference between the refrigerant temperature detected by the second refrigerant temperature detector 23 of the intermediate heat exchanger 5 and the high-pressure saturation temperature of the refrigerant obtained from the pressure value detected by the discharge pressure detector 21. The target value of the discharge pressure is determined from the number of operating indoor units or the temperature difference between the temperature detected by the indoor temperature detector 28 provided indoors and the set temperature as a load of heating. In addition, the target value of the suction pressure is determined from the outside temperature detected by the outdoor temperature detector 27. The target value of the difference between the inlet and outlet temperatures of the brine in the intermediate heat exchanger 5 is determined by the target value determined by the operation mode, described later.

While the refrigerant cycle configuration of the air-conditioning apparatus 100 shown in FIG. 1 is described with a case where the refrigerant and the brine in the intermediate heat exchanger 5 flow in a parallel-flow manner at the time of the cooling operation and flow in a counter-flow manner at the time of the heating operation as an example, the invention is not limited thereto. For example, similar control is achieved even in a cycle configuration in which the refrigerant and the brine in the intermediate heat exchanger 5 flow in a counter-flow manner both at the time of the cooling operation and at the time of the heating operation.

Here, a method of setting the target value of the difference between the inlet and outlet temperatures of the brine in the intermediate heat exchanger 5 according to the operation mode will be studied. In the following description, a case where R410A refrigerant is employed as the refrigerant circulating in the primary-side cycle and water is employed as the brine circulating in the secondary-side cycle of the air-conditioning apparatus 100 will be given as an example.

Figure 5:
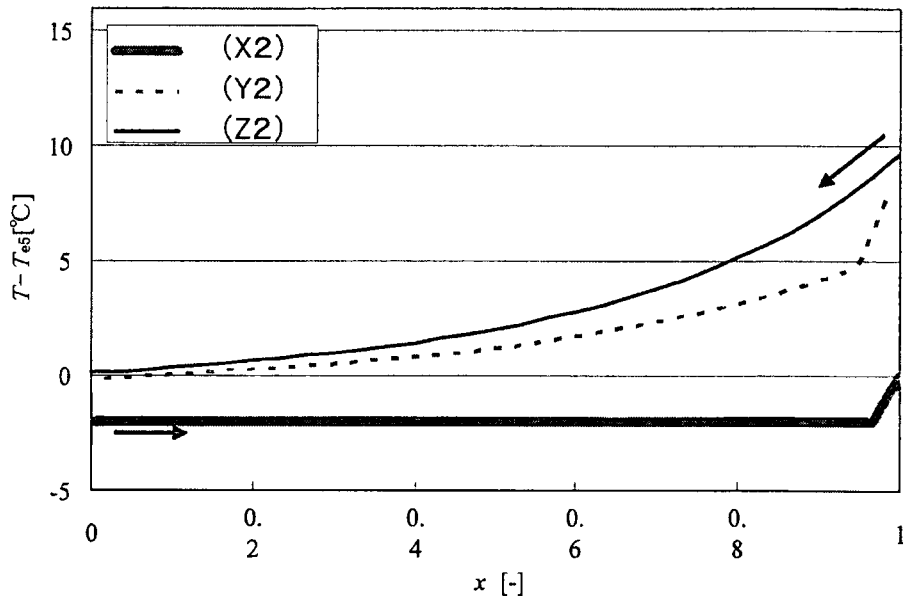
FIG. 5 is a graph showing the temperature distributions of the refrigerant and the brine in the intermediate heat exchanger at the time of the cooling operation of the air-conditioning apparatus according to Embodiment 1.

FIG. 4 and FIG. 5 are graphs showing the temperature distributions of the refrigerant and the brine in the intermediate heat exchanger 5 at the time of the cooling operation. FIG. 4 shows an outline of refrigerant temperature (line (X1)), pipeline wall temperature (line (Y1)), and brine temperature (line (Z1)) when the difference between the temperatures of the brine at the inlet and outlet of the intermediate heat exchanger 5 is controlled to be 5 degrees C. FIG. 5 shows an outline of refrigerant temperature (line (X2)), pipeline wall temperature (line (Y2)), and brine temperature (line (Z2)) when the difference between the temperatures of the brine at the inlet and outlet of the intermediate heat exchanger 5 is controlled to be 10 degrees C. In FIG. 4 and FIG. 5, the vertical axis represents the temperature [degree C.], and the lateral axis represents the position in the main stream directions of the refrigerant and the brine.

Signs x [–] shown on the lateral axes in FIG. 4 and FIG. 5 represent the positions in the main stream direction of the refrigerant when the entire length of the intermediate heat exchanger 5 is assumed to be 1. In other words, the refrigerant flows from x=0 to x=1. Also, assuming the counter flow in which the refrigerant and the brine flow in opposite directions, the brine flows from x=1 to x=0. The temperatures [degree C.] shown on the vertical axes in FIG. 4 and FIG. 5 are represented based on an evaporating temperature (Te5) of the refrigerant in a case of FIG. 4.

As shown in FIG. 4, at the time of the cooling operation, the refrigerant flows into the intermediate heat exchanger 5 in a state of gas-liquid two-phase flow when x=0, and exchanges heat with the brine to evaporate at a substantially constant temperature. The refrigerant completely evaporates downstream in the intermediate heat exchanger 5 (in the vicinity of x=1), resulting in a gas-single-phase flow. The refrigerant exchanges heat with the brine to increase the temperature. Here, when assuming a large value for the difference between the inlet and outlet temperatures of the brine under the same capacity, the temperature of the brine at the inlet of the intermediate heat exchanger 5 increases and the temperature of the brine at the outlet of the intermediate heat exchanger 5 decreases by the amount of the increase in the difference between the inlet and outlet temperatures of the brine as shown in FIG. 5. Then, the suction pressure decreases by the amount of the decrease in the flow-in temperature of the brine.

In the flow control of the refrigerant, when considering the measurement error of the temperature detector, it is necessary to set the target value of the degree of superheat of the refrigerant to a temperature on the order of 2 degrees C. or higher. In contrast, when assuming a large value for the degree of superheat of the refrigerant at the outlet of the intermediate heat exchanger 5, the heat transfer rate of the single phase refrigerant gas is lowered and the heat exchanging performance of the intermediate heat exchanger 5 is lowered. Additionally, the inlet entropy of the compressor 1 increases. Therefore, the performance of the refrigeration cycle is lowered. The degree of superheat may be set to a temperature on the order of 2 degrees C. irrespective of the difference between the inlet and outlet temperatures of the brine. At this time, even when the difference between the inlet and outlet temperatures of the brine is changed, the optimum enthalpy difference of the refrigerant shows little change, and the flow rate of the refrigerant which satisfies the required capacities does not change. However, when the difference between the inlet and outlet temperatures of the brine increases, the performance of the refrigeration cycle is lowered by the amount of the decrease in the suction pressure. Therefore, when the intermediate heat exchanger 5 is used as an evaporator for the refrigerant, it is recommended to reduce the difference between the inlet and outlet temperatures of the brine so as to enhance the performance of the refrigeration cycle.

When assuming a small value for the difference between the inlet and outlet temperatures of the brine in the intermediate heat exchanger 5, the inputs of the pump 11 increase by the amount of the increase in the flow rate of the brine while when assuming a large value for the difference between the inlet and outlet temperatures, the inputs of the pump 11 decrease by the amount of the reduction in the flow rate of the brine. Here, an example of the difference between the inlet and outlet temperatures of the water at the time of the cooling operation will be described. The inputs of the pump 11 are changed due to the pipeline resistance such as an air-conditioning load or the length of the brine pipe, and the adequate temperature difference is changed. Also, specifically for the brine pipe, it is necessary to set an upper limit to a value on the order of 1.5 m/s to 3.0 m/s depending on the water temperature so as to avoid occurrence of corrosion of the pipe. For example, when the refrigeration capacity on the order of 7 kW is required, a pipe having an inner diameter on the order of φ20 may be used as the brine pipe so as to generate a temperature difference on the order of 3 to 7 degrees C. when the length of the water pipe is not taken into consideration or when the distance from the pump 11 to the indoor unit is not longer than 10 m and generate a temperature difference on the order of 7 to 9 degrees C. when the distance is 40 m or longer. While the case where the refrigerant and the brine flow in a counter-flow manner has been described as an example, the same applies to the parallel flow.

Figure 6:
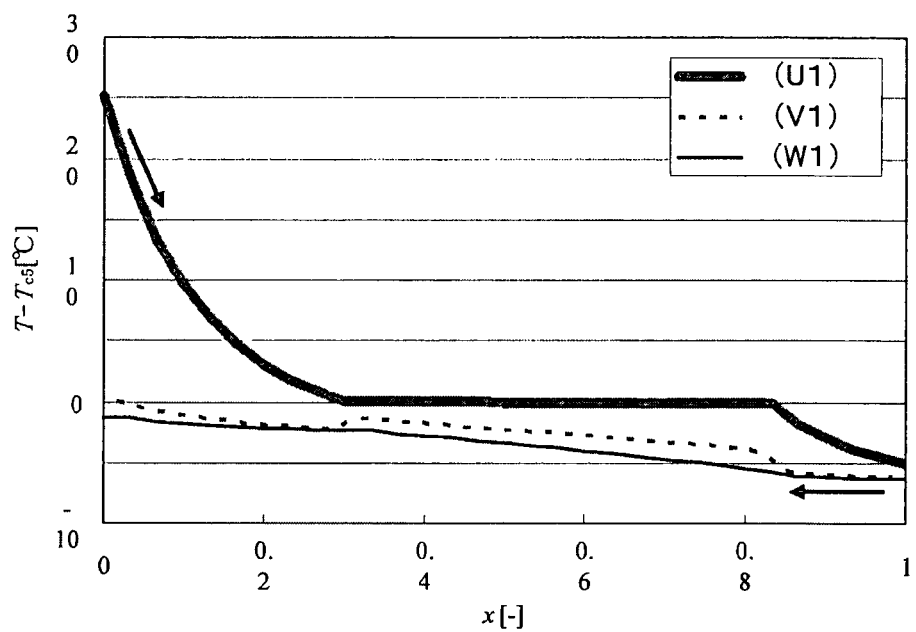
FIG. 6 is a graph showing the temperature distributions of the refrigerant and the brine in the intermediate heat exchanger at the time of the heating operation of the air-conditioning apparatus according to Embodiment 1.
Figure 7:
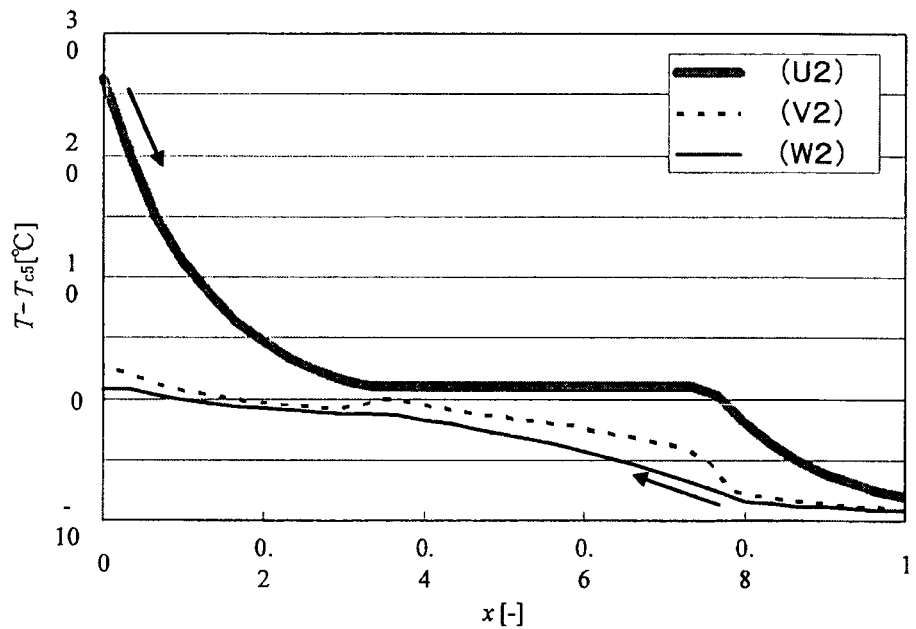
FIG. 7 is a graph showing the temperature distributions of the refrigerant and the brine in the intermediate heat exchanger at the time of the heating operation of the air-conditioning apparatus according to Embodiment 1.

FIG. 6 and FIG. 7 are graphs showing the temperature distributions of the refrigerant and the brine in the intermediate heat exchanger 5 at the time of the heating operation. FIG. 6 shows an outline of refrigerant temperature (line (U1)), pipeline wall temperature (line (V1)), and brine temperature (line (W1)) when the difference between the temperatures of the brine at the inlet and outlet of the intermediate heat exchanger 5 is controlled to be 5 degrees C. FIG. 7 shows an outline of refrigerant temperature (line (U2)), pipeline wall temperature (line (V2)), and brine temperature (line (W2)) when the difference between the temperatures of the brine at the inlet and outlet of the intermediate heat exchanger 5 is controlled to be 10 degrees C. In FIG. 6 and FIG. 7, the vertical axis represents the temperature [degree C.], and the lateral axis represents the position in the main stream direction of the refrigerant and the brine.

As in FIG. 4 and FIG. 5, the signs x [–] shown on the lateral axes in FIG. 6 and FIG. 7 represent the positions in the main stream direction of the refrigerant when the entire length of the intermediate heat exchanger 5 is assumed to be 1. In other words, the refrigerant flows from x=0 to x=1. Also, assuming the counter flow in which the refrigerant and the brine flow in opposite directions, the brine flows from x=1 to x=0. The temperatures [degree C.] shown on the vertical axes in FIG. 6 and FIG. 7 are represented based on a condensing temperature (Tc5) of the refrigerant in the case of FIG. 6.

As shown in FIG. 6, at the time of the heating operation, the refrigerant flows into the intermediate heat exchanger 5 in a state of gas-single-phase flow when x=0, and exchanges heat with the brine to decrease the temperature. When the temperature reaches the condensing temperature of the refrigerant, the refrigerant enters a gas-liquid two-phase state, and exchanges heat with the brine in the state of gas-liquid two-phase to be condensed at a substantially constant temperature. In addition, when the refrigerant is condensed completely and is in a liquid single-phase flow, the refrigerant exchanges heat with the brine to decrease the temperature. When assuming a large value for the difference between the inlet and outlet temperatures of the brine under the same capacity, the temperature of the brine at the inlet of the intermediate heat exchanger 5 increases and the temperature of the brine at the outlet of the intermediate heat exchanger 5 decreases by the amount of the increase in the difference between the inlet and outlet temperatures, similarly to that in the cooling operation, as shown in FIG. 7.

However, even when the temperature of the brine increases at x=0, the gas temperature of the refrigerant is high, and the margin of the increase in condensing temperature is smaller than the margin of the decrease in evaporating temperature at the time of the cooling operation. Also, the temperature difference between the refrigerant and the brine increases in the vicinity of x=1, so that the temperature of the refrigerant at the outlet can be lowered to increase the enthalpy difference in the intermediate heat exchanger 5 and, if the capacity is the same, the flow rate of the refrigerant can be lowered. The inputs of the compressor 1 increase or decrease due to the increase in discharge pressure in association with the increase in temperature of the brine at the outlet and due to the of enhancement of the performance of the refrigeration cycle in association with the reduction in the temperature of the refrigerant at the outlet. Thus an optimal point of the refrigeration cycle exists when the difference between the inlet and outlet temperatures of the brine is larger than that in the cooling operation.

When assuming a small value for the difference between the inlet and outlet temperatures of the brine in the intermediate heat exchanger 5, the inputs of the pump 11 increase by the amount of the increase in the flow rate of the brine while when assuming a large value for the difference between the inlet and outlet temperatures, the inputs of the pump 11 decrease by the amount of the reduction in the flow rate of the brine. Although the inputs of the pump 11 are changed by the pipeline resistance such as the air-conditioning load or the length of the brine pipe and the temperature difference suitable for the heating operation changes, for example, when the heating capacity on the order of 7.9 kW is required, the pipe having an inner diameter on the order of φ20 may be used as the brine pipe so as to generate a temperature difference on the order of 5 to 15 degrees C. when the length of the brine pipe is not taken into consideration or when the distance from the pump 11 to the indoor unit is not longer than 10 m, and generate a temperature difference on the order of 10 to 20 degrees C. when the distance is 40 m or longer.

Here, the case where the refrigerant and the brine flow in a counter-flow manner has been described. In the heating operation, when the refrigerant and the brine flow in a parallel-flow manner, it is necessary to set the refrigerant temperature in the intermediate heat exchanger 5 to be constantly higher than the outlet temperature of the brine, and hence the condensing temperature is significantly increased, and the efficiency of the refrigeration cycle is lowered. In other words, the intermediate heat exchanger 5 is preferably installed so that the refrigerant and the brine flow in a counter-flow manner at the time of the heating operation.

The degree of supercooling SC at the outlet of the intermediate heat exchanger 5 needs to be set to be less than or equal to the difference between the inlet and outlet temperatures of the water because if the degree of supercooling SC is set to be larger than the difference between the inlet and outlet temperatures of the brine, the condensing temperature is increased and the efficiency of the refrigeration cycle is lowered. Accordingly, the intermediate heat exchanger 5 can be used efficiently, and the COP is enhanced. In addition, when the load is small in both the cooling operation and the heating operation, if the difference between the inlet and outlet temperatures of the brine is constant, the flow rate of the brine may be reduced, and the heat transfer property can be degraded due to the deterioration of the path balance or the reduction in the Reynolds number. Therefore, it is desirable that the flow rate of the brine be increased by setting the temperature difference to be smaller than that in the case of the large load.

For example, in the case where the length of the brine pipe does not exceed 10 m, the function expression or the like with respect to the indoor load which makes the temperature difference 7 degrees C. in the rated operation in the cooling operation, 4 degrees C. in the intermediate operation in the cooling operation, 10 degrees C. in the rated operation in the heating operation, and 5 degrees C. in the intermediate operation in the heating operation may be prepared in advance to set the target value again on the basis of a current cooling or heating load of the air conditioner, and the pipeline resistance of the brine pipe.

At the time of the heating operation, the brine at a temperature in the vicinity of 40 degrees C. which returns from the heating indoor unit flows into the intermediate heat exchanger 5. In a case where the refrigerant which is operated in the supercritical state under the high-side pressure, for example, carbon dioxide refrigerant, is used at the time of the heating operation, the specific heat of the refrigerant is increased in a range from 30 degrees C. to 45 degrees C. in an area where the high-side pressure falls within 8 MPa to 11 MPa. It is extremely effective in improving the efficiency of the refrigeration cycle to reduce the inflow temperature of the brine to reduce the outlet temperature of the refrigerant in the intermediate heat exchanger 5 during the operation in this range. In the rated heating operation, the difference between the inlet and outlet temperatures of the water may fall in a range on the order of 10 degrees C. to 20 degrees C.

Figure 8:
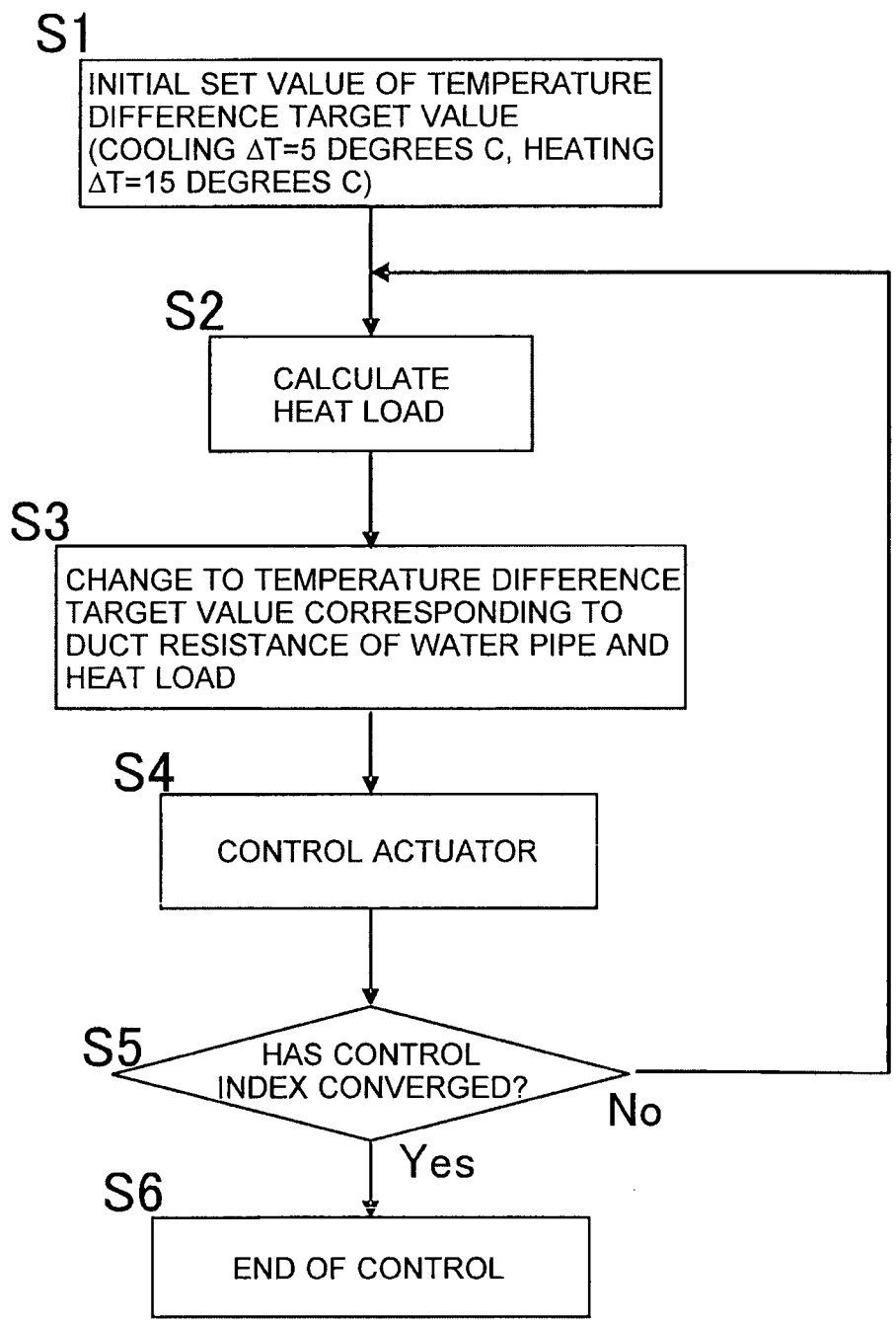
FIG. 8 is a flowchart showing the flow of a control process during the cooling operation and the heating operation of the air-conditioning apparatus according to Embodiment 1.

FIG. 8 is a flowchart showing a flow of control process during the cooling operation and the heating operation. A flow of the control process during the cooling operation and the heating operation executed by the air-conditioning apparatus 100 will be described with reference to FIG. 8. First, the control means 31 sets an initial target value of the difference between the inlet and outlet temperatures of the brine in the intermediate heat exchanger 5 (Step S1). Next, the control means 31 calculates an air-conditioning load from the number of operating indoor units or the difference between the indoor temperature and the set temperature (Step S2). Then, the control means 31 sets a target value of the difference between the inlet and outlet temperatures of the brine in the intermediate heat exchanger 5 according to whether the operation mode is a heating operation or cooling operation, the pipeline resistance of the brine pipe and the air-conditioning load (Step S3).

After that, the control means 31 controls the actuators (various elemental devices) as shown in the tables in FIG. 2 and FIG. 3 (Step S4). Then, the control means 31 determines whether or not control indices such as the discharge pressure or the difference between the inlet and outlet temperatures of the brine in the intermediate heat exchanger 5 are equal to the control target values (Step S5). In a case where the control means 31 determines that the control indices are not equal to the control target values (Step S5; No), the procedure returns to Step 2 again, and the control is repeated. In a case where the control means 31 determines that the control indices are equal to the control target values (Step S5; Yes), the controlling operation ends (Step S6).

The pipeline resistance of the brine pipe in Step S3 may be calculated as follows. The amount of heat exchange of the intermediate heat exchanger 5 may be calculated from the flow rate of the refrigerant which can be calculated from the performance of the compressor 1 and the difference between the enthalpies of the refrigerant at a position before and at a position after the intermediate heat exchanger 5, or may be set from a total sum of the capacities of the operating indoor units. The flow rate of the brine can be calculated from the calculated amount of heat exchange and the difference between the inlet and outlet temperatures of the brine in the intermediate heat exchanger 5. The pipeline resistance of the brine pipe can be calculated from the flow rate of the brine and the characteristics of the pump 11.

As described above, the air-conditioning apparatus 100 in Embodiment 1 performs control so that the difference between the temperatures of the brine at a position before and at a position after the indoor heat exchanger 12 or at a position before and at a position after the intermediate heat exchanger 5 becomes the preset target value and so that the difference is larger during the heating operation than during the cooling operation. Thus, the actuators can be controlled to be suitable for the respective operation modes, for the cooling operation and the heating operation, can be executed, whereby the operation in a state of high COP can be performed. In other words, the cycle COP of the refrigerant can be improved according to the operation mode, and the COP of the entire system can be improved by reducing the inputs of the pump 11 for driving the brine.

Embodiment 2

Figure 9:
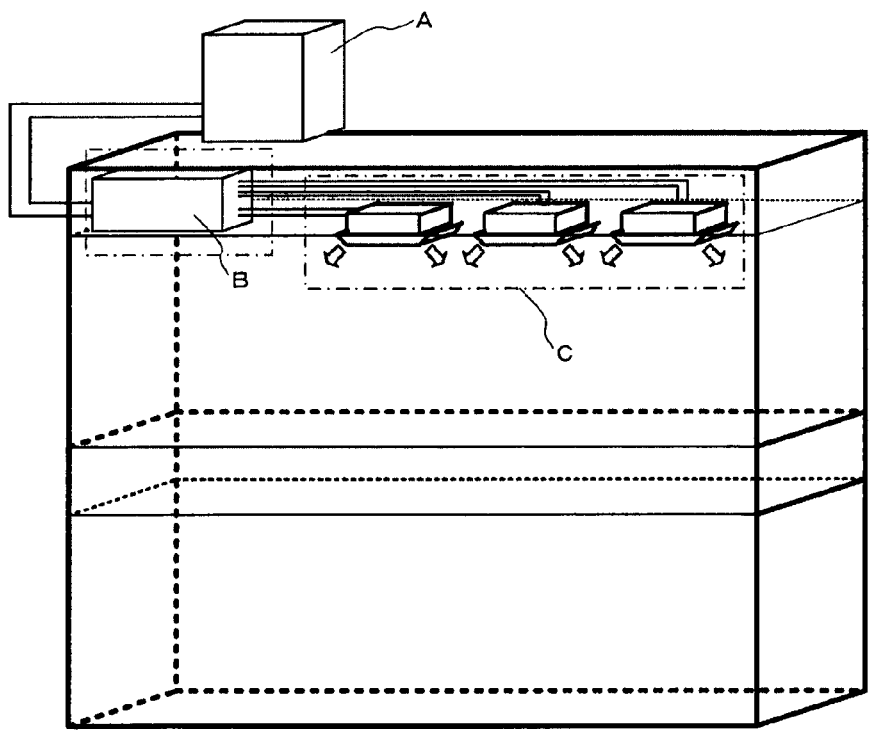
FIG. 9 is a schematic drawing showing an example of installation of an air-conditioning apparatus according to Embodiment 2.
Figure 10:
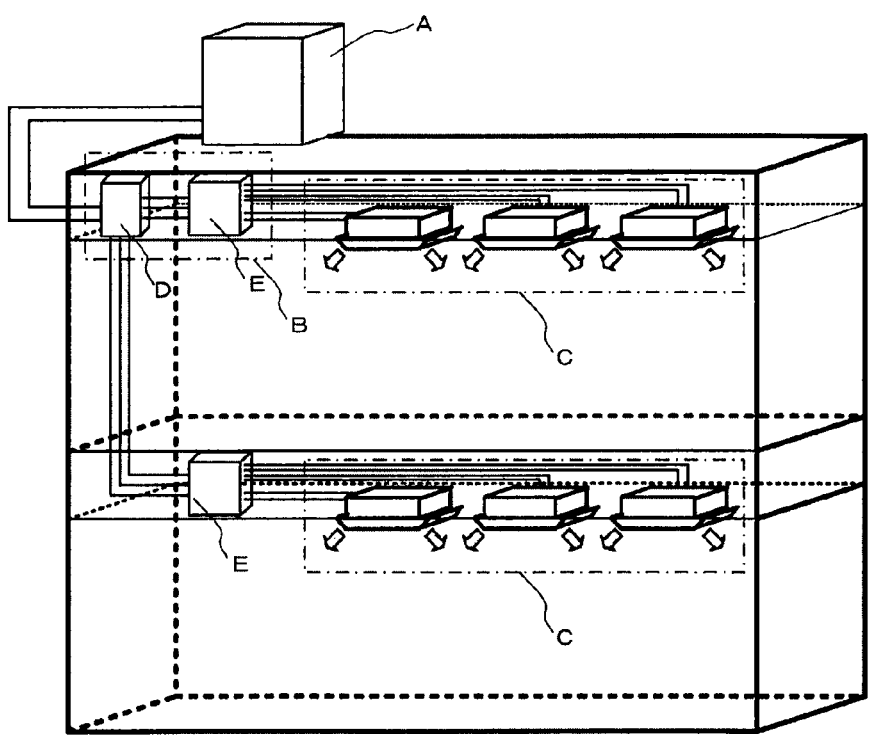
FIG. 10 is a schematic drawing showing an example of installation of the air-conditioning apparatus according to Embodiment 2.
Figure 11:
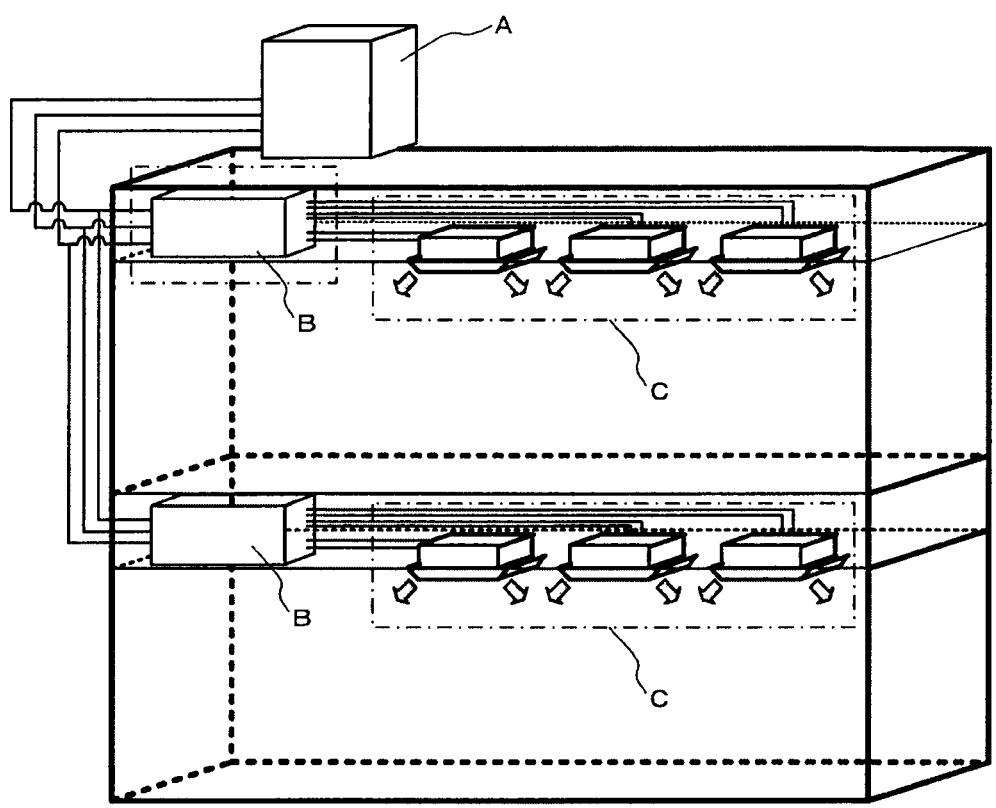
FIG. 11 is a schematic drawing showing an example of installation of the air-conditioning apparatus according to Embodiment 2.

FIG. 9 to FIG. 11 are schematic drawings showing examples of installation of an air-conditioning apparatus according to Embodiment 2 of the invention. Installation of the air-conditioning apparatus according to Embodiment 2 will be described with reference to FIG. 9 to FIG. 11. This air-conditioning apparatus is a simultaneous cooling and heating air-conditioner in which a plurality of indoor devices (indoor units) are connected to one outdoor device (outdoor unit) and each indoor unit is capable of freely selecting a cooling or heating operation mode. An example in which the transport of heat from an outdoor unit A to a diversion controller B is performed using two refrigerant pipes is shown in FIG. 9 and FIG. 10, and an example in which the transport of heat from the outdoor unit A to the diversion controller B is performed using three refrigerant pipes is shown in FIG. 11.

In the air-conditioning apparatus according to Embodiment 2, the outdoor unit A is installed in an outdoor space, which is the space outside an architectural structure such as a building. In the architectural structure, indoor units C are arranged at positions which allow heating or cooling of air in an indoor space, which corresponds to an air conditioning space, such as a living room. Then, the diversion controller B which the refrigerant flows in and out of is installed as a relay unit in an outdoor space or in a non-air conditioning space in the architectural structure which is separate from the indoor space. This air-conditioning apparatus transports heat from the outdoor unit A to the diversion controller B using the refrigerant, and transports heat from the diversion controller B to the indoor units C using the brine.

In this configuration, a safe air-conditioning apparatus which can prevent the refrigerant from entering the air-conditioning space even when the refrigerant leaks from the pipes can be obtained. Also, heat transport from the diversion controller B to the indoor units C using the refrigerant involves a flow control valve installed in the vicinity of indoor heat exchangers, which will be described in Embodiment 3 in detail. In contrast, in heat transport using the brine, a flow control valve can be installed in the diversion controller B irrespective of the indoor units C. If a flow control valve is installed in the diversion controller B and controls the temperature difference between the inlet brine and outlet brine, noise introduced into the indoor units, such as noise caused by the running of the control valve or noise caused by the flow of the refrigerant when passing through the valve, can be reduced because the control valve is located away from the indoor air conditioning space.

Also, since flow control can be centralized by the diversion controller B, the indoor units C can be controlled only by controlling the fans thereof using information such as the state of remote controllers located indoor, thermo-off, and whether or not the outdoor unit is defrosting. In addition, heat is transported from the outdoor unit A to the diversion controller B using the refrigerant, resulting in a reduction in size of the pump used for driving the brine and, additionally, the force for transporting the brine can be reduced to achieve energy saving. Furthermore, when heat is transported from the outdoor unit A to the indoor units C using the brine alone, because of simultaneous cooling and heating operation, at least two water pipes for inlet and outlet paths are required for each of the cooling and heating operations, that is, four water pipes in total are required.

Since water air conditioning is basically performed by using the temperature changes (sensible heat) of water, the mass flow rate of the water is larger than the mass flow rate when heat is transported using the refrigerant and the pipe diameter of a main pipe becomes larger. In contrast, in Embodiment 2, the pipes for connecting the outdoor unit A to the diversion controller B are configured by using two or three refrigerant pipes thinner than the water pipe. With such pipe configuration, the amount of piping extending through the wall of the architectural structure can be reduced, and the construction of the air-conditioning apparatus is facilitated. In the transport of heat only using the water, if the indoor units are located at positions higher than pumps, the water cannot be brought up to a level equal to or higher than a level where the pressure of water in the pipes become zero, that is, vacuum. In contrast, in Embodiment 2, the position of the relay unit can be changed, and hence likelihood of design is increased.

The non-air conditioning space is assumed to be a space where people does not, or rarely enter and exit in order to minimize the influence of the refrigerant on human sensitivity (for example, uncomfortable feeling or the like), for example, due to the occurrence of leakage of the refrigerant or the like. In FIG. 9 to FIG. 11, the diversion controller B can be installed in a space under the roof, which is separated from the indoor space by a wall or the like, as the non-air conditioning space. Alternatively, for example, the diversion controller B can be installed in a common space or the like where the elevator or the like is situated, for example, as the non-air conditioning space.

While the case where the outdoor unit A is installed in the outdoor space outside the architectural structure has been described as an example, the invention is not limited thereto. For example, the outdoor unit A may be installed in a surrounded space such as a machine room with an air ventilation port. The outdoor unit A may also be installed inside the architectural structure and exhaust air may be discharged to outside the architectural structure by using an exhaust air duct. In addition, the outdoor unit A may also be installed in the architectural structure when a water-cooled type heat source apparatus is used. The diversion controller B may also be placed near the outdoor unit A, which is contrary to reduction in the size of the pump and saving of energy.

In the following embodiments (Embodiments 3 to 5), specific examples of a refrigerant cycle and a water cycle for executing energy-saving operation which is suitable for cooling and heating by implementing Embodiment 1 will be described. The specific examples in FIG. 9 and FIG. 10 showing an example of installation of the air-conditioning apparatus according to Embodiment 2 will be described in Embodiment 3 and Embodiment 4, and the specific example of FIG. 11 showing an example of installation of the air-conditioning apparatus according to Embodiment 2 will be described in Embodiment 5.

Embodiment 3

Figure 12:
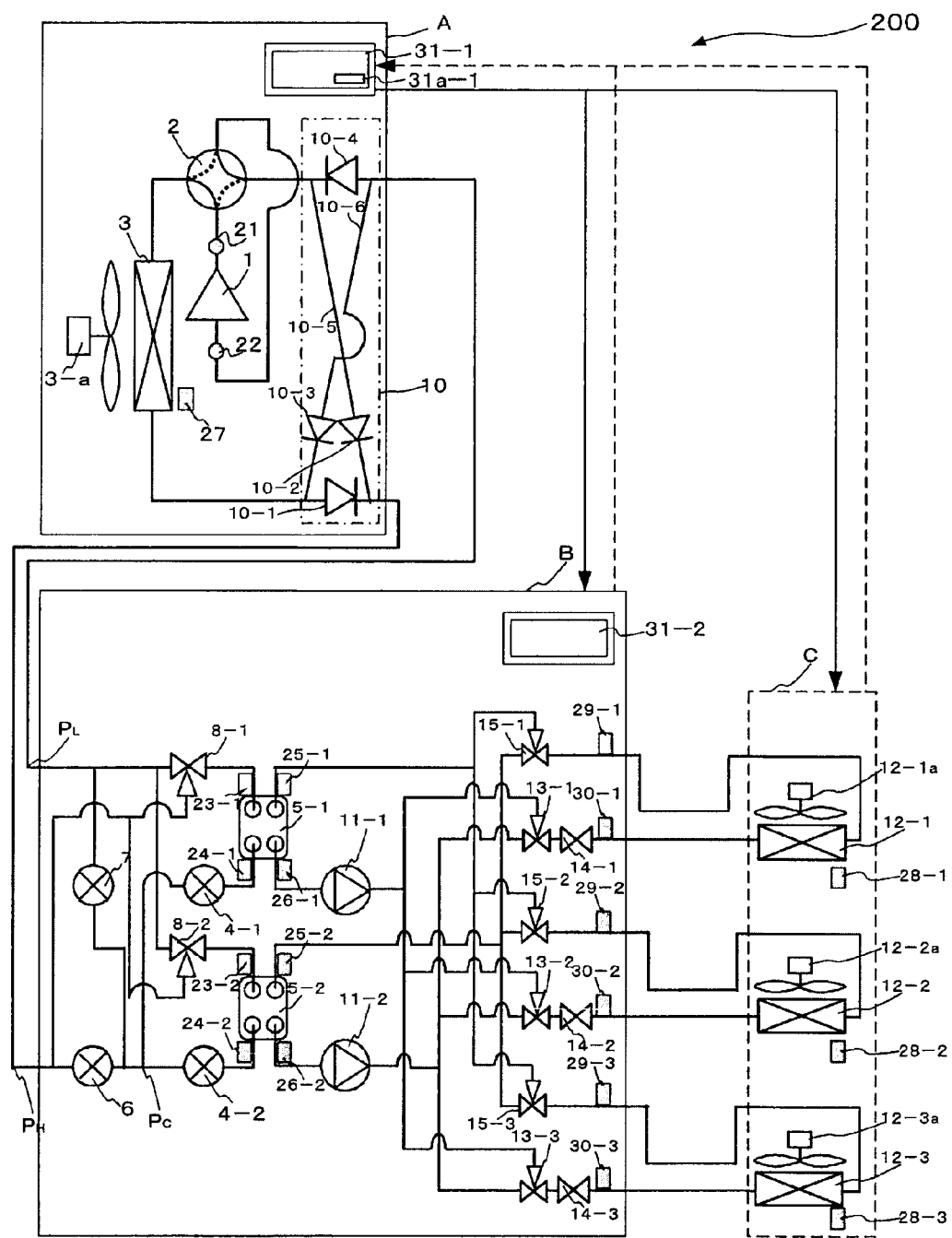
FIG. 12 is a refrigerant cycle chart showing a configuration of a refrigerant cycle in an air-conditioning apparatus according to Embodiment 3.

FIG. 12 is a refrigerant cycle chart showing a configuration of a refrigerant cycle in an air-conditioning apparatus 200 according to Embodiment 3 of the invention. A cycle configuration and an operation of the air-conditioning apparatus 200 will be described with reference to FIG. 12. This air-conditioning apparatus 200 includes a plurality of indoor heat exchangers, and is capable of cooling and heating simultaneously by using refrigeration cycles (a primary-side cycle and a secondary-side cycle) in which refrigerants (a primary-side heat transfer medium and a secondary-side heat transfer medium) circulate. In Embodiment 3, points which are different from Embodiment 1 will be described principally. The same components as in Embodiment 1 are assigned with the same numerals, and description is omitted.

The air-conditioning apparatus 200 includes one outdoor unit A, a plurality of indoor units C, and a diversion controller B interposed between these units as a relay unit. The outdoor unit A has a function to supply cooling energy and heating energy to the indoor units C via the diversion controller B. The indoor units C are installed in an air conditioning area, and have a function to supply cooling air or heating air to the air conditioning area. The diversion controller B connects the outdoor unit A and the indoor units C, and has a function to transmit the cooling energy and the heating energy supplied from the outdoor unit A to the indoor units C.

The outdoor unit A and the diversion controller B are connected via two refrigerant pipes, and the diversion controller B and each of the indoor units C are also connected via two brine pipes. Illustrated in FIG. 12 are the refrigerant inlet of the diversion controller B designated by $P_H$, the refrigerant outlet of the diversion controller B designated by $P_L$, and a branch point of the pipe connecting between a first expansion device 6 and an expansion device 4-2 designated by $P_C$.

[Outdoor Unit A]

A compressor 1, a four-way valve 2, and an outdoor heat exchanger 3 are mounted in the outdoor unit A by being connected via refrigerant pipes in series. Also, a check valve block 10 including a first connection pipe 10-5, a second connection pipe 10-6, a check valve 10-1, a check valve 10-2, a check valve 10-3, and a check valve 10-4 is provided in the outdoor unit A. This check valve block 10 has a function to align the flow of the heat source side refrigerant to flow into the diversion controller B in a fixed direction irrespective of the operations currently being executed by the indoor units C. In other words, with the check valve block 10, $P_H$ comes to the high-pressure side of the cycle, and $P_L$ comes to the low-pressure side of the cycle irrespective of the operation mode. The outdoor unit A also includes the outdoor fan 3-$a$ mounted therein.

The check valve 10-4 is provided between the diversion controller B and the four-way valve 2, and allows the refrigerant to flow only in a predetermined direction (the direction from the diversion controller B to the outdoor unit A). The check valve 10-1 is provided between the outdoor heat exchanger 3 and the diversion controller B, and allows the refrigerant to flow only in a predetermined direction (the direction from the outdoor unit A to the diversion controller B). The check valve 10-2 is provided in the first connection pipe 10-5, and allows the refrigerant to distribute only in the direction from the downstream side of the check valve 10-4 to the downstream side of the check valve 10-1. The check valve 10-3 is provided in the second connection pipe 10-6, and allows the refrigerant to distribute only in the direction from the upstream side of the check valve 10-4 to the upstream side of the check valve 10-1.

The first connection pipe 10-5 connects the refrigerant pipe on the downstream side of the check valve 10-4 and the refrigerant pipe on the downstream side of the check valve 10-1 in the outdoor unit A. The second connection pipe 10-6 connects the refrigerant pipe on the upstream side of the check valve 10-4 and the refrigerant pipe on the upstream side of the check valve 10-1 in the outdoor unit A. Also, a discharge pressure detector 21, a suction pressure detector 22, and an outdoor temperature detector 27 are provided in the outdoor unit A.

[Diversion Controller B]

The diversion controller B includes mounted therein the first expansion device 6, a second expansion device 7, two intermediate heat exchangers 5 (a first intermediate heat exchanger 5-1, a second intermediate heat exchanger 5-2), two expansion device (an expansion device 4-1, the expansion device 4-2), two heat source side three-way valves 8 (a heat source side three-way valve 8-1, a heat source side three-way valve 8-2), two pumps 11 (a first pump 11-1, a second pump 11-2), three first use side three-way valves 13 (a use side three-way valve 13-1, a use side three-way valve 13-2, and a use side three-way valve 13-3 from the upper side of the drawing), three second use side three-way valves 15 (a use side three-way valve 15-1, a use side three-way valve 15-2, a use side three-way valve 15-3 from the upper side of the drawing), three two-way valves 14 (a two-way valve 14-1, a two-way valve 14-2, a two-way valve 14-3 from the upper side of the drawing).

Although at least two intermediate heat exchangers are required for allowing each of the plurality of indoor units C connected to the diversion controller B to perform cooling and heating, three or more intermediate heat exchangers may be mounted in the diversion controller B, and fine control can be performed in accordance with the indoor load by connecting the respective elements so that the connection between the respective elements can be switched using a flow direction switching valve such as a three-way valve.

The primary-side cycle of the diversion controller B includes the first expansion device 6, the second expansion device 7, the two intermediate heat exchangers 5, the expansion device 4-1, the expansion device 4-2, and the two heat source side three-way valves 8, which are connected via pipes. The secondary cycle of the diversion controller B includes the two pumps 11, the three first use side three-way valves 13, the three second use side three-way valves 15, the three two-way valves 14, and the two intermediate heat exchangers 5, which are connected via pipes.

The first expansion device 6 is provided between the check valve 10-1 and the expansion device 4-2, has a function as a reducing valve and an expansion device, and expands the refrigerant by reducing the pressure. The first expansion device 6 may be constituted by a device which can variably control an opening-degree, for example, an electronic expansion valve or the like. The second expansion device 7 is provided in parallel with the expansion device 4-1, has a function as a reducing valve and an expansion device, and expands the refrigerant by reducing the pressure. The second expansion device 7 may be constituted by a device which can variably control an opening-degree, for example, an electronic expansion valve or the like.

The first intermediate heat exchanger 5-1 and the second intermediate heat exchanger 5-2 are capable of producing cold water and hot water individually. Therefore, the air-conditioning apparatus 200 is capable of executing the cooling operation in which all indoor heat exchangers 12 perform cooling, the heating operation in which all the indoor heat exchangers 12 perform heating, and, in addition, the simultaneous cooling and heating operation in which an indoor heat exchanger 12 that performs cooling and an indoor heat exchanger 12 that performs heating exist simultaneously. When the air-conditioning apparatus 200 executes the simultaneous cooling and heating operation, each of the first intermediate heat exchanger 5-1 and the second intermediate heat exchanger 5-2 performs the cooling operation and the heating operation.

The first intermediate heat exchanger 5-1 is provided between the expansion device 4-1 and the heat source side three-way valve 8-1 in the primary-side cycle. The second intermediate heat exchanger 5-2 is provided between the expansion device 4-2 and the heat source side three-way valve 8-2 in the primary-side cycle. The expansion device 4-1 is provided on the upstream side of the first intermediate heat exchanger 5-1 in the primary-side cycle. The expansion device 4-2 is provided on the upstream side of the intermediate heat exchangers 5-2 in the primary-side cycle.

The two heat source side three-way valves 8 switch the flow of the refrigerant depending on the cooling operation or the heating operation. The heat source side three-way valve 8-1 is connected at one of the three lines thereof to the first intermediate heat exchanger 5-1, at another of the three lines thereof to a branch pipe branching from between the check valve 10-1 and the first expansion device 6, and at the other of the three lines thereof to the refrigerant pipe between the heat source side three-way valve 8-2 and the check valve 10-4. The second heat source side three-way valve 8-2 is connected at one of the three lines thereof to the second intermediate heat exchanger 5-2, at another of the three lines thereof to the branch pipe branching from between the check valve 10-1 and the first expansion device 6, and at the other of the three lines thereof to the check valve 10-4.

Figure 13:
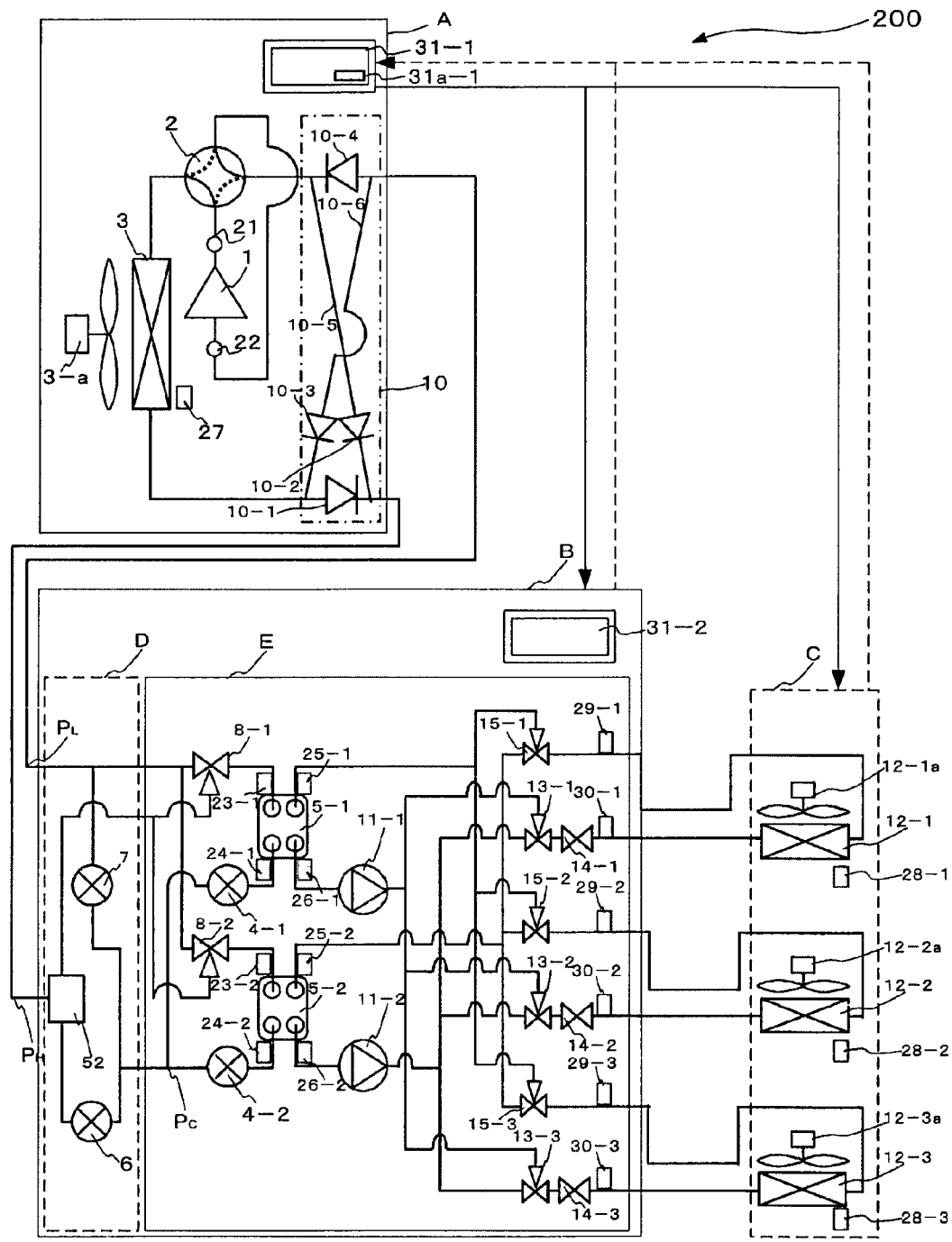
FIG. 13 is a refrigerant cycle chart showing a configuration of the refrigerant cycle in the air-conditioning apparatus according to Embodiment 3.

As shown in FIG. 13, a gas-liquid separator 52 may be installed at the high-pressure side inlet of the diversion controller B. In this configuration, the diversion controller B can be divided into a parent diversion controller D that diverts the refrigerant for cooling and heating, and a child diversion controller E in which each of the first intermediate heat exchangers 5-1 and 5-2 selects the cooling or heating operation and can be connected by three refrigerant pipes. Therefore, the diversion controller B can be divided into sections which can be installed separately, and a plurality of child diversion controllers E can be connected to the parent diversion controller D.

The first pump 11-1 is provided between the first intermediate heat exchanger 5-1 and the first use side three-way valve 13 in the secondary cycle. The second pump 11-2 is provided between the second intermediate heat exchanger 5-2 and the first use side three-way valve 13 in the secondary cycle. The three first use side three-way valves 13 selectively switch between the supply of cold water and hot water to the indoor units C in the simultaneous cooling and heating operation. A number of (three in this case) first use side three-way valves 13, which corresponds to the number of installed indoor units C, can be provided. Each of the first use side three-way valves 13 is connected at one of the three lines thereof to the first intermediate heat exchanger 5-1, at another of the three lines thereof to the second intermediate heat exchanger 5-2, and at the other of the three lines thereof to the two-way valve 14.

The three second use side three-way valves 15 switch the flow direction of the brine which returns from the indoor heat exchanger 12 to the intermediate heat exchangers 5, and are set so that the indoor units 12 and the intermediate heat exchangers 5 are connected in the same direction as that in the first use side three-way valves. A number of (three in this case) second use side three-way valves 15, which corresponds to the number of installed indoor units C, can be provided. Each of the second use side three-way valves 15 is connected at one of the three lines thereof to the first intermediate heat exchanger 5-1, at another of the three lines thereof to the second intermediate heat exchanger 5-2, and at the other of the three lines thereof to the indoor heat exchanger 12. The three two-way valves 14 are designed such that the opening and closing of the two-way valves 14 is controlled to control the flow rate of the brine. A number of (three in this case) two-way valves 14, which corresponds to the number of installed indoor units C, can be provided. Each of the two-way valves 14 is connected at one side thereof to the indoor heat exchanger 12, and at the other side thereof to the first use side three-way valve 13.

The diversion controller B is provided with two first refrigerant temperature detectors 23 (a first refrigerant temperature detector 23-1 on the first intermediate heat exchanger 5-1 side, a first refrigerant temperature detector 23-2 on the second intermediate heat exchanger 5-2 side), two second refrigerant temperature detectors 24 (a second refrigerant temperature detector 24-1 on the first intermediate heat exchanger 5-1 side, a second refrigerant temperature detector 24-2 on the second intermediate heat exchanger 5-2 side), two first brine temperature detectors 25 (a first brine temperature detector 25-1 on the first intermediate heat exchanger 5-1 side and a first brine temperature detector 25-2 on the second intermediate heat exchanger 5-2 side), and two second brine temperature detectors 26 (a second brine temperature detector 26-1 on the first intermediate heat exchanger 5-1 side and a second brine temperature detector 26-2 on the second intermediate heat exchanger 5-2 side).

In addition, the diversion controller B is provided with three third brine temperature detectors 29 (a third brine temperature detector 29-1, a third brine temperature detector 29-2, and a third brine temperature detector 29-3 from the upper side of the drawing), and three fourth brine temperature detectors 30 (a fourth brine temperature detector 30-1, a fourth brine temperature detector 30-2, and a fourth brine temperature detector 30-3 from the upper side of the drawing). The third brine temperature detectors 29 are provided between the indoor heat exchangers 12 and the second use side three-way valves 15, and measure the temperature of the brine passing therethrough. The fourth brine temperature detectors 30 are provided between the two-way valves 14 and the indoor heat exchangers 12, and measure the temperature of the brine passing therethrough. It should be noted that information measured by the third brine temperature detectors 29 and the fourth brine temperature detectors 30 are also sent to the control means 31.

[Indoor Unit C]

An indoor unit C includes mounted therein three indoor heat exchangers 12 (an indoor heat exchanger 12-1, an indoor heat exchanger 12-2, and an indoor heat exchanger 12-3 from the upper side of the drawing) and three indoor fans 12-a (an indoor fan 12-1a, an indoor fan 12-2a, and an indoor fan 12-3a from the upper side of the drawing). The indoor heat exchangers 12 are connected to the two-way valves 14 and the second use side three-way valves 15 provided in the diversion controller B. In addition, the indoor unit C is provided with indoor temperature detectors 28 (an indoor temperature detector 28-1, an indoor temperature detector 28-2, and an indoor temperature detector 28-3 from the upper side of the drawing).

As described above, when the heat transport from the diversion controller B to the indoor units C is performed by also using the refrigerant, the flow control in the respective indoor units C is performed by the control of the degree of superheat (SH) and the control of the degree of supercooling (SC) of the refrigerant. Since the temperature of the refrigerant changes significantly when the pressure changes, a temperature sensor is installed in the vicinity of an indoor heat exchanger instead of on the diversion controller B side generally via an extension pipe. Therefore, a flow control valve is installed generally on the indoor units C side so that the significant temperature changing information of the temperature sensor is not communicated.

In contrast, when the heat transport from the diversion controller B to the indoor units C is performed using water, the temperature change does not occur even when the pressure of the water is lowered due to the flow thereof in an extension pipe. Therefore, it is possible to install the temperature sensor in the diversion controller B. In other words, the temperature sensor and the flow control valve can be installed on the diversion controller B instead of the indoor units C.

Here, operations of the cooling operation in which all the indoor units C perform the cooling operation, the heating operation in which all the indoor units C perform the heating operation, a cooling-main operation in which the indoor units C simultaneously perform the cooling operation and the heating operation and in which the cooling load is larger than the heating load, and a heating-main operation the indoor units C simultaneously perform the cooling operation and the heating operation and in which the heating load is larger than the cooling load will be described.

[Cooling Operation]

Figure 14:
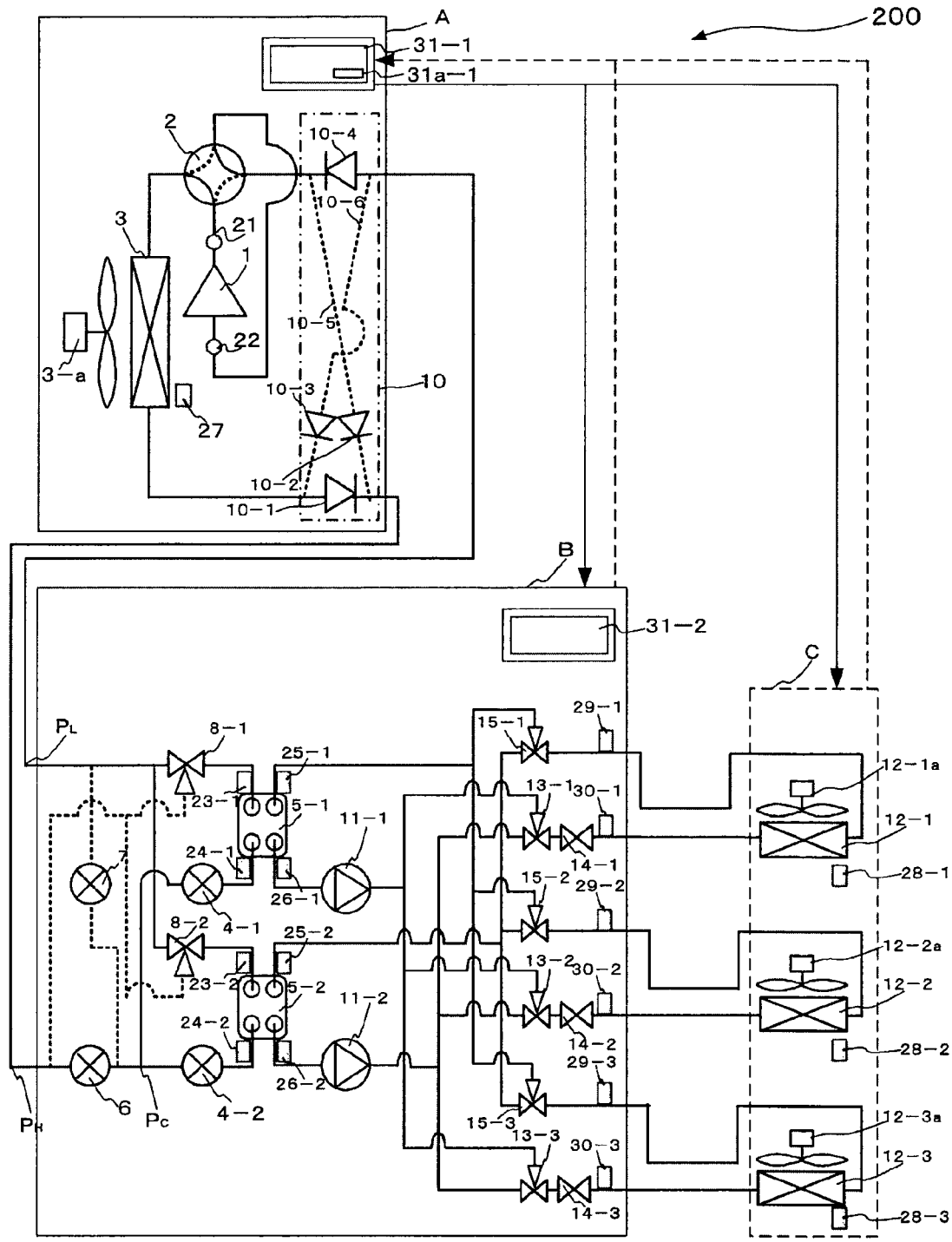
FIG. 14 is a drawing showing flows of the refrigerant and the brine at the time of the cooling operation of the air-conditioning apparatus according to Embodiment 3.

FIG. 14 is a drawing showing flows of the refrigerant and the brine at the time of the cooling operation of the air-conditioning apparatus 200 according to Embodiment 3.

First of all, the flow of the refrigerant will be described. At the time of the cooling operation, the four-way valve 2 is switched so as to allow the refrigerant discharged from the compressor 1 to flow into the outdoor heat exchanger 3. The pressure of the refrigerant sucked into the compressor 1 is increased in the compressor 1, and the outdoor heat exchanger 3 exchanges heat between the refrigerant and the outside air to condense the refrigerant. This condensed liquid refrigerant passes through the expansion device 6, and is distributed to two routes of refrigerant cycles, and the expansion device 4-1 and the expansion device 4-2 reduce the pressure of the refrigerant to obtain low-temperature and low-pressure two-phase refrigerant. The first intermediate heat exchanger 5-1 and the second intermediate heat exchanger 5-2 exchange heat between the refrigerant and water for cooling to obtain low-temperature and low-pressure gas refrigerant. The refrigerant returns to the compressor 1.

Subsequently, the flow of water will be described. At the time of the cooling operation, cold water is refined in both the intermediate heat exchangers 5-1 and 5-2. Therefore, both of the outbound three-way valves 13 and the inbound three-way valves 15 may be opened on half way so that water from respective water channels may be mixed. The cold water generated in the intermediate heat exchanger 5-1 and the intermediate heat exchanger 5-2 passes through the three-way valves 13, and is sent to the indoor heat exchangers 12. It should be noted that the intermediate heat exchanger 5-1 and the intermediate heat exchanger 5-2 may generate water in different temperature zones in accordance with the cooling load of the indoor units C, and switch between the flow directions by controlling the three-way valves 13 and the three-way valves 15 in accordance with the state of load of the indoor units C. At this time, the pressure of the cold water cooled in the water heat exchangers (intermediate heat exchangers) is increased by the pumps 11, and flow directions are selected by the three-way valves 13. The two-way valves 14 perform flow control so that the difference between the temperatures at a position before and at a position after the indoor heat exchangers 12 (the temperature difference between the third brine temperature detectors 29 and the fourth brine temperature detectors 30) becomes equal to a predetermined value, and the indoor heat exchangers 12 exchange heat between the cold water and the indoor air to cool the indoor air. The three-way valves 15 select flow directions so that the brine can flow into the initial intermediate heat exchanger, and the cold water returns to the intermediate heat exchanger 5-1 or the intermediate heat exchanger 5-2.

[Heating Operation]

Figure 15:
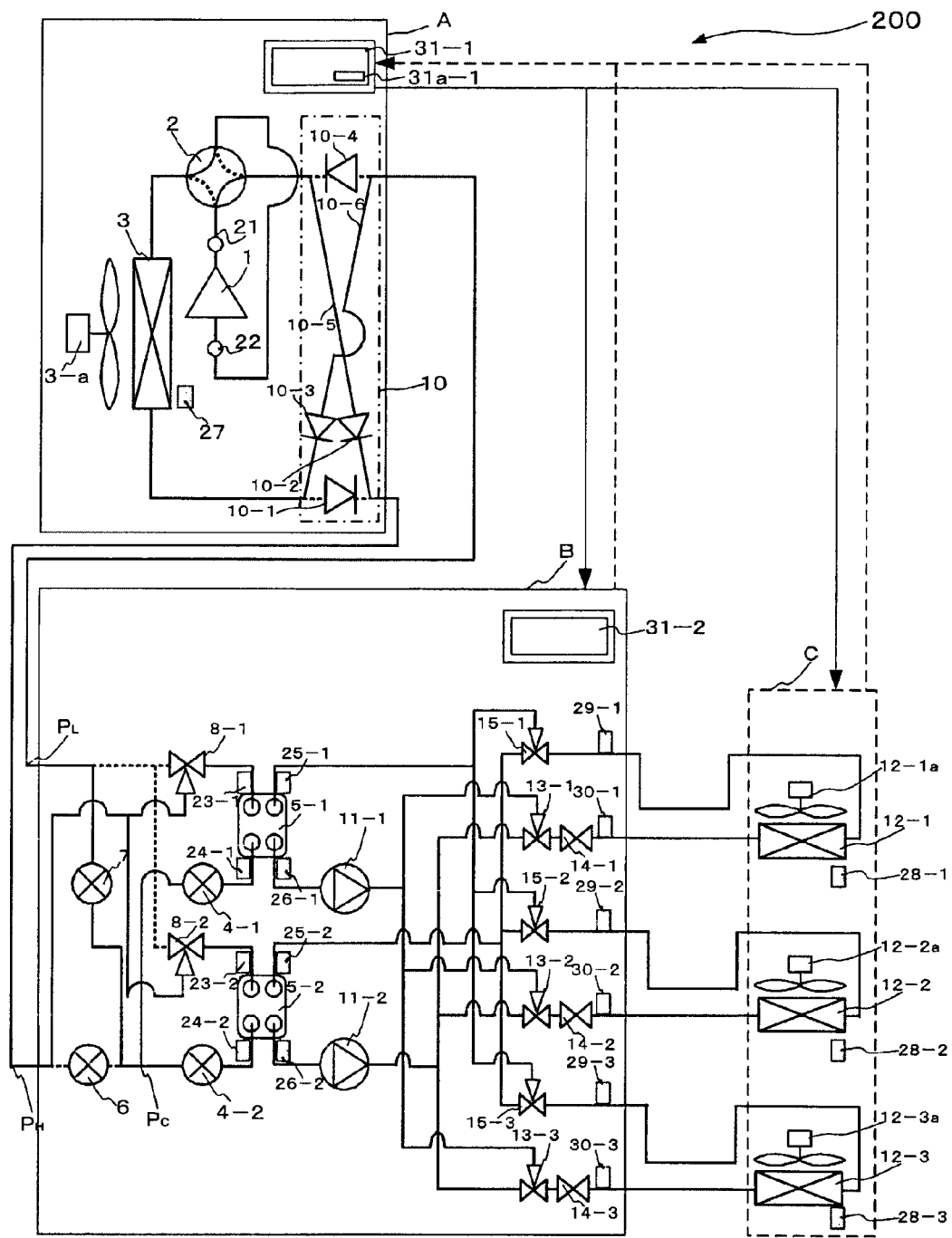
FIG. 15 is a drawing showing the flows of the refrigerant and the brine at the time of the heating operation of the air-conditioning apparatus according to Embodiment 3.

FIG. 15 is a drawing showing flows of the refrigerant and the brine at the time of the heating operation of the air-conditioning apparatus 200 according to Embodiment 3.

First of all, the flow of the refrigerant will be described. At the time of the heating operation, as shown in FIG. 15, the four-way valve 2 is switched so as to allow the refrigerant discharged from the compressor 1 to flow into the check valve block 10. The pressure of the refrigerant sucked into the compressor 1 is increased in the compressor 1, and the refrigerant is supplied to the diversion controller B, in which the refrigerant is distributed to two routes of refrigerant cycles, and the intermediate heat exchanger 5-1 and the intermediate heat exchanger 5-2 exchange heat between the refrigerant and the brine for heating to condense the refrigerant. The pressure of the condensed refrigerant is reduced in the expansion device 4-1, the expansion device 4-2, and the second expansion device 7 to obtain low-temperature and low-pressure two-phase refrigerant. The outdoor heat exchanger 3 exchanges heat between the refrigerant and the outside air to produce low-temperature and low-pressure gas refrigerant, and the refrigerant returns to the compressor 1.

Subsequently, the flow of water will also be described. At the time of the heating operation, hot water is refined in both the intermediate heat exchangers 5-1 and 5-2. Therefore, both of the outbound three-way valves 13 and the inbound three-way valves 15 may be opened on a halfway so that water from respective water channels may be mixed. The hot water generated in the intermediate heat exchanger 5-1 and the intermediate heat exchanger 5-2 passes through the three-way valves 13, and is sent to the indoor heat exchangers 12. It should be noted that the intermediate heat exchanger 5-1 and the intermediate heat exchanger 5-2 may generate water in different temperature zones in accordance with the heating load of the indoor units C, and switch between the flow directions by controlling the three-way valves 13 and the three-way valves 15 in accordance with the state of load of the indoor units C. At this time, the pressure of the hot water heated in the water heat exchangers is increased by the pumps 11, and flow directions are selected by the three-way valves 13. The two-way valves 14 perform flow control so that the difference between the temperatures at a position before and at a position after the indoor heat exchangers 12 (the temperature difference between the third brine temperature detectors 29 and the fourth brine temperature detectors 30) becomes equal to a predetermined value, and the indoor heat exchangers 12 exchange heat between the hot water and the indoor air to heat the indoor air. The three-way valves 15 select flow directions so that the brine can flow into the initial intermediate heat exchanger, and the hot water returns to the intermediate heat exchanger 5-1 or the intermediate heat exchanger 5-2.

[Cooling-Main Operation]

Figure 16:
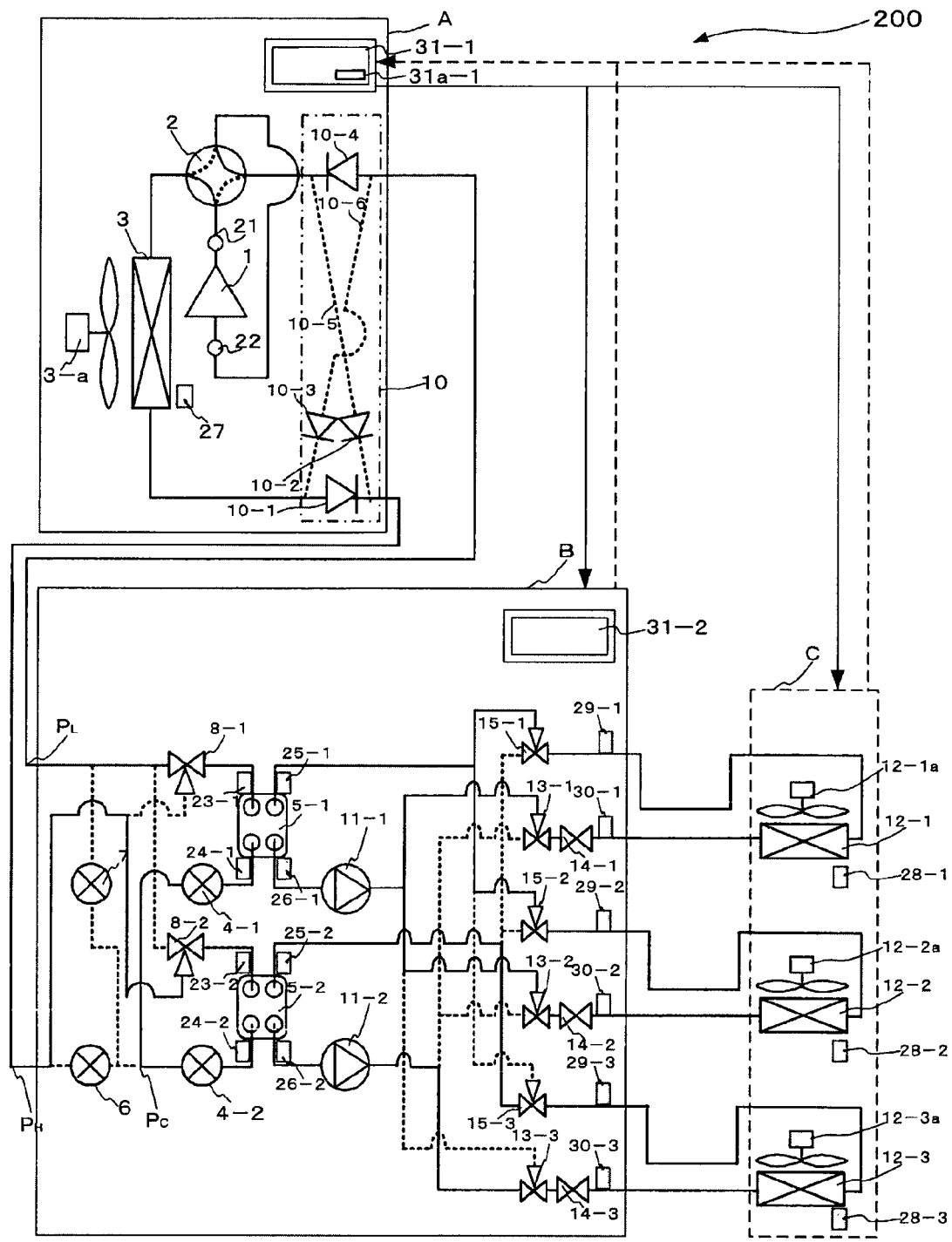
FIG. 16 is a drawing showing the flows of the refrigerant and the brine at the time of a cooling-main operation of the air-conditioning apparatus according to Embodiment 3.

FIG. 16 is a drawing showing flows of the refrigerant and the brine at the time of the cooling-main operation of the air-conditioning apparatus 200 according to Embodiment 3.

First of all, the flow of the refrigerant will be described. The connection of the four-way valve 2 at the time of the cooling-main operation is the same as that in the cooling operation. The pressure of the refrigerant sucked into the compressor 1 is increased in the compressor 1, and the outdoor heat exchanger 3 radiates heat excessively generated by the heating capacity. Further, the intermediate heat exchanger 5-2 heats water. After that, the water in the intermediate heat exchanger 5-1 is cooled and returns to the compressor 1.

Subsequently, the flow of water will be described. The three-way valves 13 and the three-way valves 15 select the heating or cooling operation of the indoor heat exchangers 12. An indoor heat exchanger 12 which performs heating is connected to the intermediate heat exchanger 5-2 for heating, and an indoor heat exchanger 12 which performs cooling is connected to the intermediate heat exchanger 5-1 for cooling. The pressure of the cold water and the hot water generated in the respective water heat exchangers is increased by the pumps 11, and flow directions are selected by the three-way valves 13. The two-way valves 14 send the cold water and the hot water to the indoor heat exchangers 12 while performing flow control so that the difference between the temperatures at a position before and at a position after the indoor heat exchangers 12 (the temperature difference between the third brine temperature detectors 29 and the fourth brine temperature detectors 30) becomes equal to a predetermined value. The indoor heat exchangers 12 perform cooling and heating, and the three-way valves 15 select flow directions so that the brine can flow into the initial intermediate heat exchanger, and the cold water and the hot water return to the intermediate heat exchanger 5-1 or the intermediate heat exchanger 5-2.

[Heating-Main Operation]

Figure 17:
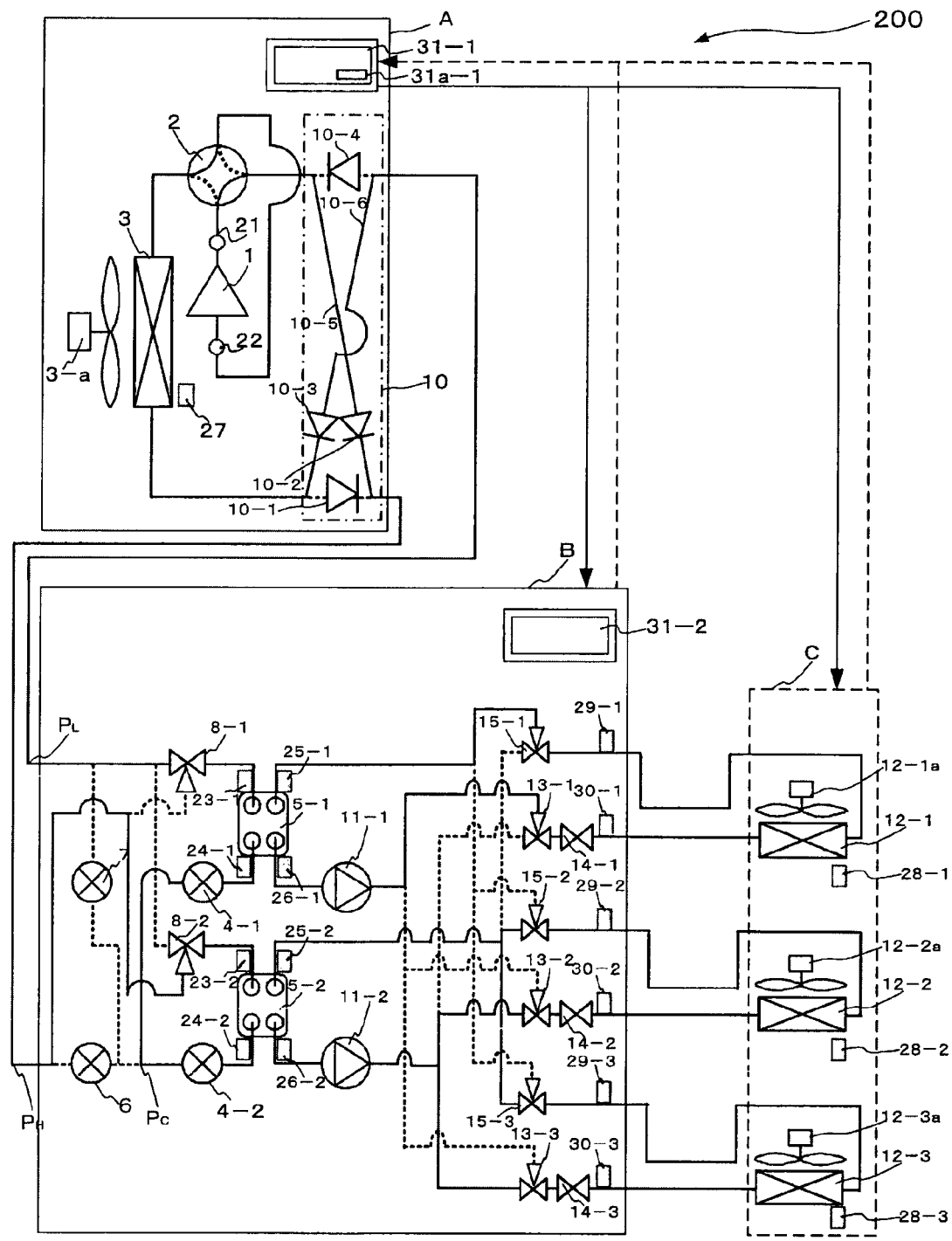
FIG. 17 is a drawing showing the flows of the refrigerant and the brine at the time of a heating-main operation of the air-conditioning apparatus according to Embodiment 3.

FIG. 17 is a drawing showing flows of the refrigerant and the brine at the time of the heating-main operation of the air-conditioning apparatus 200 according to Embodiment 3.

First of all, the flow of the refrigerant will be described. The connection of the four-way valve 2 at the time of the heating-main operation is the same as that in the heating operation. The pressure of the refrigerant sucked into the compressor 1 is increased in the compressor 1, and the intermediate heat exchanger 5-2 for heating exchanges heat between the refrigerant and water for heating to condense the refrigerant. The expansion device 4-2 and the expansion device 4-1 reduce the pressure of the condensed liquid refrigerant to decrease the temperature. The refrigerant flows into the intermediate heat exchanger 5-1 for cooling, and exchanges heat with water for cooling. After that, the outdoor heat exchanger 3 exchanges heat between the refrigerant and the outside air, and the refrigerant returns to the compressor 1.

Subsequently, the flow of water will be described. The three-way valves 13 and the three-way valves 15 select the heating or cooling operation of the indoor heat exchangers 12. An indoor heat exchanger 12 which performs heating is connected to the intermediate heat exchanger 5-2 for heating, and an indoor heat exchanger 12 which performs cooling is connected to the intermediate heat exchanger 5-1 for cooling. The pressure of the cold water and the hot water generated in the respective water heat exchangers is increased by the pumps 11, and flow directions are selected by the three-way valves 13. The two-way valves 14 send the cold water and the hot water to the indoor heat exchangers 12 while performing flow control so that the difference between the temperatures at a position before and at a position after the indoor heat exchangers 12 (the temperature difference between the third brine temperature detectors 29 and the fourth brine temperature detectors 30) becomes equal to a predetermined value. The indoor heat exchangers 12 perform cooling and heating, and the three-way valves 15 select flow directions so that the brine can flow into the initial intermediate heat exchanger, and the cold water and the hot water return to the intermediate heat exchanger 5-1 or the intermediate heat exchanger 5-2.

In the respective operation modes, similarly to Embodiment 1, the frequency of the compressor 1 and the speed of the outdoor fan 3-a are controlled by the suction pressure and the discharge pressure. A control means (an outdoor unit side control device) 31-1 that is installed in the outdoor unit A is capable of performing efficient operation in accordance with the load by calculating the cooling load and the heating load from the operating state sent from the indoor units C, and by changing the setting of the respective target values of the suction pressure and the discharge pressure so as to achieve adequate heat exchange in the intermediate heat exchanger 5-1 and the intermediate heat exchanger 5-2 according to the state of load.

The control means 31-1 further performs the arithmetic computation of the target value of the temperature difference of the brine in the intermediate heat exchanger 5-1 and the intermediate heat exchanger 5-2 and the target value of the degree of supercooling at the time of the heating operation according to the state of load on the basis of Embodiment 1, and transmits a signal including data relating to the target values or increase or decrease of the target values to a control means (relay unit control device) 31-2 installed in the diversion controller B. The control means 31-2 is capable of performing operation in a state of high COP by resetting the target values on the basis of the received data and controls the flow control valve of the refrigerant and brine. It should be noted that the control means 31-2 may perform the arithmetic computation of the control target values and send the data on the target values of the control to be performed by the control means 31-1 to the control means 31-1.

In this embodiment, when the intermediate heat exchanger 5-1 and the intermediate heat exchanger 5-2 perform cooling, the heat source side three-way valve 8-1 and the heat source side three-way valve 8-2 are controlled to be connected to P₁, and when the intermediate heat exchanger 5-1 and the intermediate heat exchanger 5-2 perform heating, the heat source side three-way valve 8-1 and the heat source side three-way valve 8-2 are controlled to be connected to P$_H$. Therefore, the cooling operation and the heating operation can be switched according to the indoor load and, when all the indoor units C perform the cooling operation or the heating operation, the two water heat exchangers can be used for cooling or for heating. Accordingly, more efficient operation than Embodiment 1 in which a single water heat exchanger is mounted can be achieved.

Also, in the air-conditioning apparatus 200 as well, each of the intermediate heat exchanger for cooling and the intermediate heat exchanger for heating can set and control the target value of the temperature difference based on Embodiment 1. Therefore, operation in a state of high COP achieved. It should be noted that a cycle in which the high-pressure portion and the low-pressure portion are fixed by the check valve block 10 has been described in this example; however, even in a case where the cycle in which the high-pressure portion and the low-pressure portion are reversed at the time of heating and at the time of cooling is employed with the check valve block 10 omitted, each of the intermediate heat exchanger for cooling and the intermediate heat exchanger for heating can set and control the target value of the temperature difference based on Embodiment 1. Therefore, operation in a state of high COP can be achieved.

Embodiment 4

Figure 18:
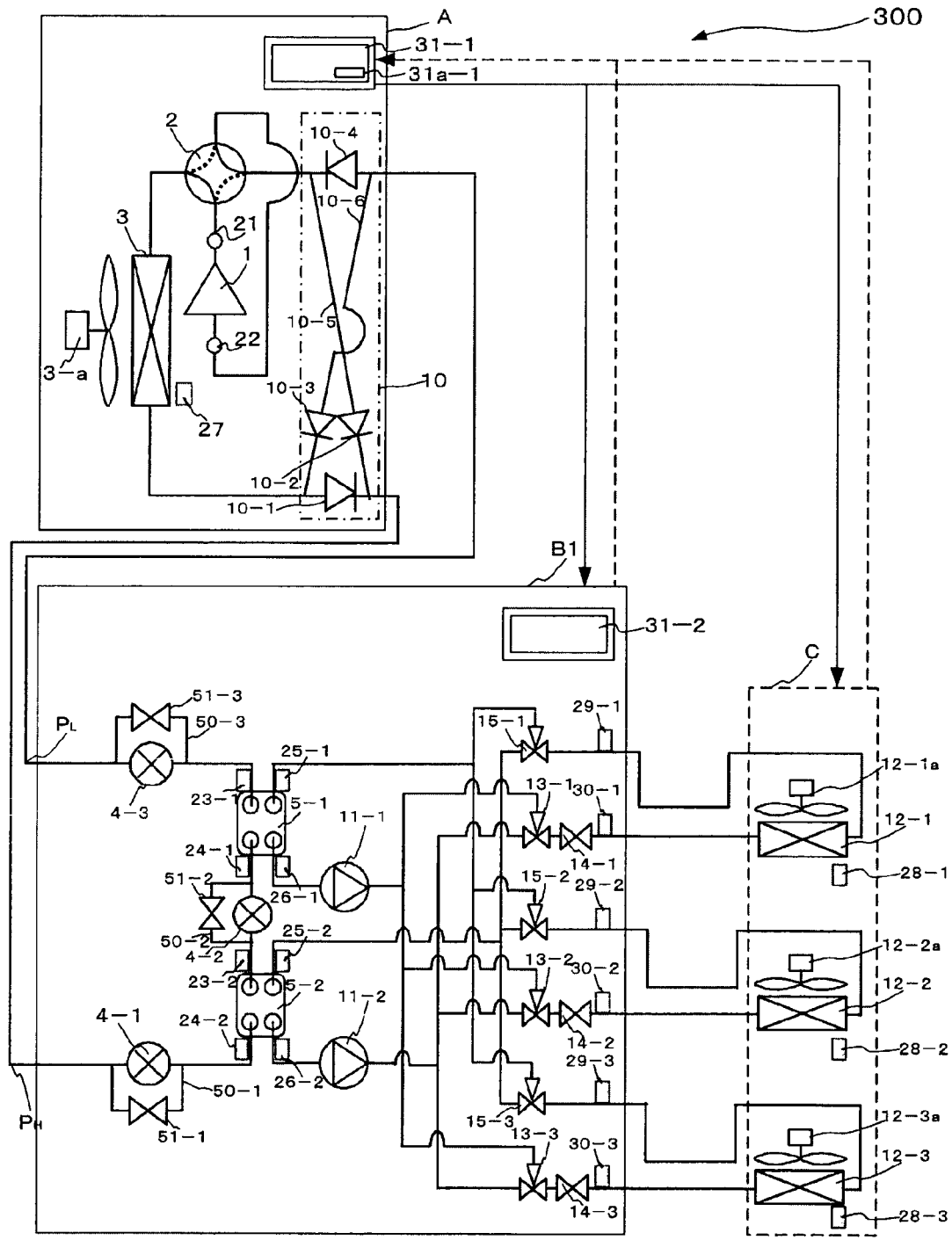
FIG. 18 is a refrigerant cycle chart showing a configuration of a refrigerant cycle in an air-conditioning apparatus according to Embodiment 4.

FIG. 18 is a refrigerant cycle chart showing a configuration of a refrigerant cycle in an air-conditioning apparatus 300 according to Embodiment 4 of the invention. A cycle configuration and an operation of the air conditioning apparatus 300 will be described with reference to FIG. 18. The air-conditioning apparatus 300 includes a plurality of indoor heat exchangers, and is capable of performing cooling and heating simultaneously by using refrigeration cycles (a primary-side cycle and a secondary-side cycle) which cause refrigerants (a primary-side heat transfer medium and a secondary-side heat transfer medium) to circulate. In Embodiment 4, points which are different from Embodiment 1 and Embodiment 3 will be described principally. The same components as in Embodiment 1 and Embodiment 3 are assigned with the same numerals, and description is omitted.

The configuration of a diversion controller (hereinafter, referred to as a diversion controller B1) of the air-conditioning apparatus 300 is different from that of the diversion controller B of the air-conditioning apparatus 200 according to Embodiment 3. Other configuration of the air-conditioning apparatus 300 is similar to that of the air-conditioning apparatus 200 according to Embodiment 3. However, the diversion controller B1 is not provided with the first expansion device 6, the second expansion device 7, and the heat source side three-way valves 8 because the first intermediate heat exchanger 5-1 and the second intermediate heat exchanger 5-2 are directly connected. Instead, the diversion controller B1 is provided with an expansion device 4-3, a bypass pipe 50 which bypasses each of the expansion device 4-1 to the expansion device 4-3, and on-off valves 51 that open and close the bypass pipes 50.

[Diversion Controller B1]

The first intermediate heat exchanger 5-1 and the second intermediate heat exchanger 5-2 are connected in series and are mounted in the diversion controller B1. The expansion device 4-1 is provided before (upstream from) the second intermediate heat exchanger 5-2, the expansion device 4-2 is provided between the second intermediate heat exchanger 5-2 and the first intermediate heat exchanger 5-1, and the expansion device 4-3 is provided after (downstream from) the first intermediate heat exchanger 5-1. Also, the diversion controller B1 is provided with a bypass pipe 50-1 which bypasses the expansion device 4-1, an on-off valve 51-1 which opens and closes the bypass pipe 50-1, an on-off valve 51-1 which opens and closes the bypass pipe 50-1, a bypass pipe 50-2 which bypasses the expansion device 4-2, an on-off valve 51-2 which opens and closes the bypass pipe 50-2, a bypass pipe 50-3 which bypasses the expansion device 4-3, and an on-off valve 51-3 which opens and closes the bypass pipe 50-3.

Although at least two intermediate heat exchangers are required for each of a plurality of indoor units C connected to the diversion controller B1 to perform cooling and heating, three or more intermediate heat exchangers may be mounted in the diversion controller B1, and fine control can be performed in accordance with the indoor load by connecting the respective elements so that the connection between the respective elements can be switched using a three-way valve.

Here, the movement of the refrigerant in the cooling operation, the heating operation, the cooling-main operation, and the heating-main operation executed by the air-conditioning apparatus 300 according to Embodiment 4 of the invention will be described. The operation of the brine is similar to that in Embodiment 3, and description thereof is thus omitted.

[Cooling Operation]

At the time of the cooling operation, the on-off valve 51-2 and the on-off valve 51-3 are opened and the on-off valve 51-1 is closed. The connection of the four-way valve 2 is switched so as to allow the refrigerant discharged from the compressor 1 to flow into the outdoor heat exchanger 3. The pressure of the refrigerant sucked into the compressor 1 is increased in the compressor 1, and the outdoor heat exchanger 3 exchanges heat between the refrigerant and the outside air to condense the refrigerant. The expansion device 4-1 reduces the pressure of this condensed refrigerant to obtain low-temperature and low-pressure two-phase refrigerant. The first intermediate heat exchanger 5-1 and the second intermediate heat exchanger 5-2 exchange heat between the refrigerant and water for cooling to obtain low-temperature and low-pressure gas refrigerant. The refrigerant returns to the compressor 1.

[Heating Operation]

At the time of the heating operation, the on-off valve 51-1 and the on-off valve 51-2 are opened and the on-off valve 51-3 is closed. The connection of the four-way valve 2 is switched so as to allow the refrigerant discharged from the compressor 1 to flow into the check valve block 10. The pressure of the refrigerant sucked into the compressor 1 is increased in the compressor 1, and the intermediate heat exchanger 5-1 and the intermediate heat exchanger 5-2 exchange heat between the refrigerant and the brine for heating to condense the refrigerant. The expansion device 4-3 reduces the pressure of this condensed refrigerant to obtain low-temperature and low-pressure two-phase refrigerant. The outdoor heat exchanger 3 exchanges heat between the refrigerant and the outside air to obtain low-temperature and low-pressure gas refrigerant. The refrigerant returns to the compressor 1.

[Cooling-Main Operation]

At the time of the cooling-main operation, the on-off valve 51-1 and the on-off valve 51-3 are opened and the on-off valve 51-2 is closed. The connection of the four-way valve 2 is switched in the same manner as in the cooling operation. The pressure of the refrigerant sucked into the compressor 1 is increased in the compressor 1, and the outdoor heat exchanger 3 radiates heat excessively generated by the heating capacity. Further, the intermediate heat exchanger 5-2 heats water. After that, the water in the intermediate heat exchanger 5-1 is cooled and returns to the compressor 1.
[Heating-Main Operation]

At the time of the heating-main operation, the on-off valve 51-1 and the on-off valve 51-3 are opened and the on-off valve 51-2 is closed. The connection of the four-way valve 2 is switched in the same manner as in the heating operation. The pressure of the refrigerant sucked into the compressor 1 is increased in the compressor 1, and the intermediate heat exchanger 5-2 for heating exchanges heat between the refrigerant and water for heating to condense the refrigerant. The expansion device 4-2 and the expansion device 4-1 reduce the pressure of the condensed refrigerant to decrease the temperature. The refrigerant flows into the intermediate heat exchanger 5-1 for cooling, and exchanges heat with water for cooling. After that, the outdoor heat exchanger 3 exchanges heat between the refrigerant and the outside air, and the refrigerant returns to the compressor 1.

Since the air-conditioning apparatus 300 is configured as described above, the flow speed of the refrigerant can be increased and hence the performance of the heat exchangers can be improved in comparison with the case where the intermediate heat exchanger 5-1 and the intermediate heat exchanger 5-2 are connected in parallel. When all the indoor heat exchangers 12 perform the cooling operation, the flow of the refrigerant becomes a gas-liquid two-phase flow on substantially the entirety of both of the first intermediate heat exchanger 5-1 and the second intermediate heat exchanger 5-2. There is little difference in heat transfer capacities between the first intermediate heat exchanger 5-1 and the second intermediate heat exchanger 5-2, and the operation with the differences between the inlet and outlet temperatures of the brine being made equal in both intermediate heat exchangers leads to operation in a state of high COP.

When all of the indoor heat exchangers 12 perform the heating operation, the refrigerant becomes an area of heated gas in the first intermediate heat exchanger 5-1, so that the temperature difference between the brine and the refrigerant is large, which facilitates the heat exchange therebetween. In contrast, in the second intermediate heat exchanger 5-2, the refrigerant becomes an area of supercooled liquid, so that the temperature difference between the brine and the refrigerant is small, which impedes makes heat exchange.

In order to utilize the heat transfer surface of the heat exchangers effectively, the difference between the inlet and outlet temperatures of the brine in the first intermediate heat exchanger 5-1 is set to be a large value to reduce the flow rate of the brine, and the difference between the inlet and outlet temperatures of the brine in the second intermediate heat exchanger 5-2 is set to be small to increase the flow rate of the brine, thereby improving the performance. Also, when performing simultaneous cooling and heating operation, the expansion device 4-1 and the expansion device 4-3 are fully opened, and the refrigerant undergoes pressure drop in the expansion device 4-2, thereby producing cold water in the first intermediate heat exchanger 5-1 and hot water in the second intermediate heat exchanger 5-2. Accordingly, the amount of heat exchange can be controlled adequately according to the temperature distribution of the respective intermediate heat exchangers 5. Therefore, in the air-conditioning apparatus 300 as well, each of the intermediate heat exchanger for cooling and the intermediate heat exchanger for heating can set and control the target values of the temperature difference based on Embodiment 1. Thus, operation in a state of high COP can be achieved.

It should be noted that a cycle in which the high-pressure portion and the low-pressure portion are fixed by the check valve block 10 has been described in this example; however, even in a case where the cycle in which the high-pressure portion and the low-pressure portion are reversed at the time of heating and at the time of cooling is employed with the check valve block 10 omitted, each of the intermediate heat exchanger for cooling and the intermediate heat exchanger for heating can set and control the target value of the temperature difference based on Embodiment 1. Therefore, operation in a state of high COP can be achieved. Additionally, although at least two intermediate heat exchangers are required for each of a plurality of indoor units C connected to the diversion controller B1 to perform cooling and heating, three or more intermediate heat exchangers may be mounted in the diversion controller B1 and fine control can be performed in accordance with the indoor load by connecting the respective elements so that the connection between the respective elements can be switched using a three-way valve.
Embodiment 5

Figure 19:
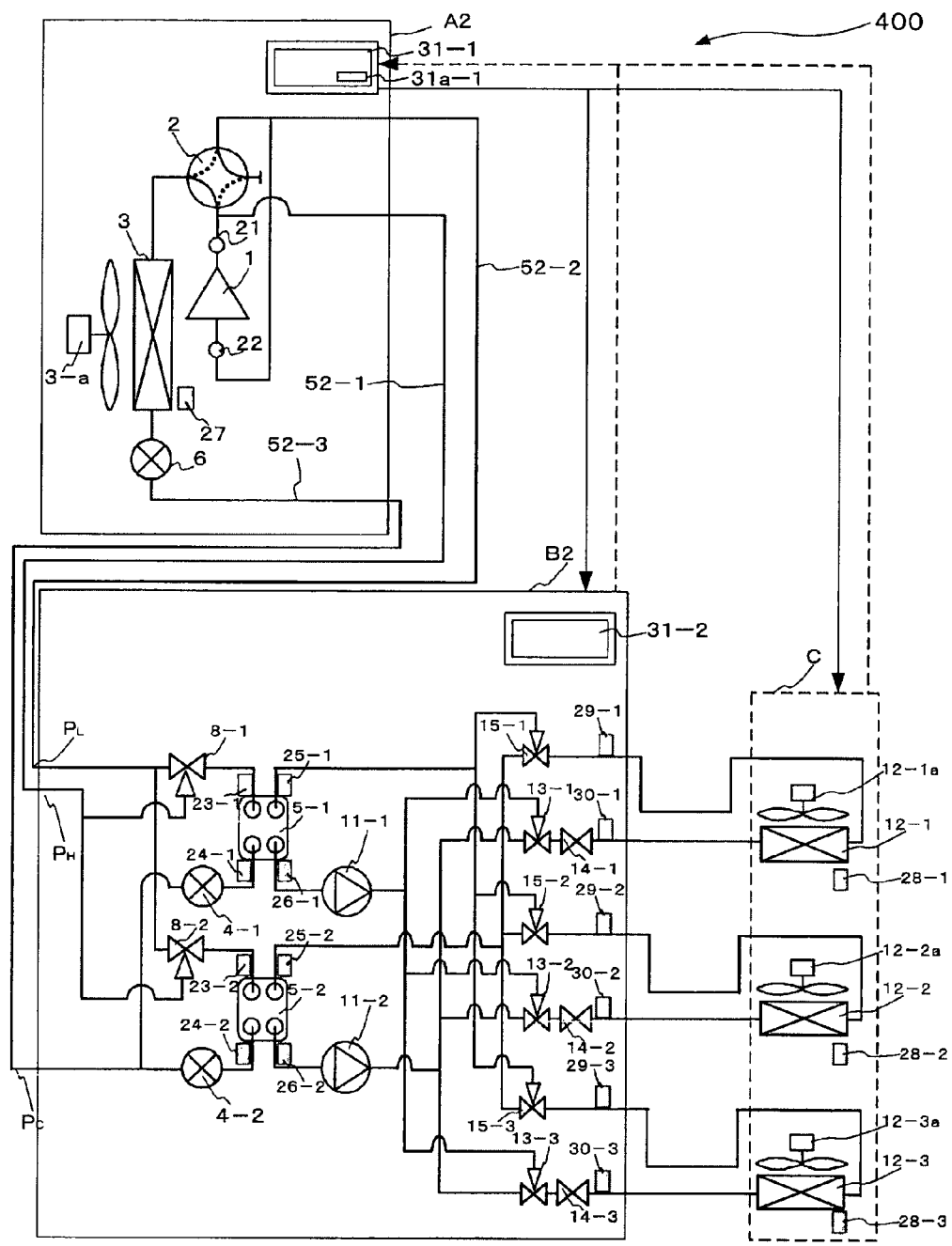
FIG. 19 is a refrigerant cycle chart showing a configuration of a refrigerant cycle in an air-conditioning apparatus according to Embodiment 5.

FIG. 19 is a refrigerant cycle chart showing a configuration of a refrigerant cycle in an air-conditioning apparatus 400 according to Embodiment 5 of the invention. A cycle configuration and an operation of the air conditioning apparatus 400 will be described with reference to FIG. 19. The air-conditioning apparatus 400 includes a plurality of indoor heat exchangers, and is capable of performing cooling and heating simultaneously by using refrigeration cycles (a primary-side cycle and a secondary-side cycle) which cause refrigerants (a primary-side heat transfer medium and a secondary-side heat transfer medium) to circulate. In Embodiment 5, points which are different from Embodiment 1, Embodiment 3, and Embodiment 4 will be described principally. The same components as in Embodiment 1, Embodiment 3, and Embodiment 4 are assigned with the same numerals, and description is omitted.

The configuration of an outdoor unit (hereinafter, referred to as an outdoor unit A2), a diversion controller (hereinafter, referred to as a diversion controller B2), and extension pipes that connect these members is different from that of the outdoor unit A, the diversion controller B, and expansion pipes that connect these members in the air-conditioning apparatus 200 according to Embodiment 3. Other configuration of the air-conditioning apparatus 400 is similar to that of the air-conditioning apparatus 200 according to Embodiment 3.
[Connecting Pipes]

The air-conditioning apparatus 400 includes, as pipes that connect the outdoor unit A2 and the diversion controller B2, a high-pressure pipe 52-1 that supplies the refrigerant discharged from the compressor 1 to an intermediate heat exchanger 5 used for heating when an indoor unit C that performs the heating operation exists, a low-pressure pipe 52-2 that returns the refrigerant from an intermediate heat exchanger 5 used for cooling to the compressor 1 when an indoor unit C that performs the cooling operation exists, and a middle-pressure pipe 52-3 that moves an intermediate pressure refrigerant between the outdoor heat exchanger 3 and the diversion controller B2.
[Outdoor Unit A2]

A branch portion is provided in the discharge pipe of the compressor 1 and is connected to the high-pressure pipe 52-1, and a branch portion is provided in the inlet pipe of the compressor 1 and is connected to the low-pressure pipe 52-2. The four-way valve 2 is switched, due to the cooling/heating ratio of the indoor units C, so as to connect the pipes as indicated by a solid line in the drawing when it is required for the outdoor heat exchanger 3 to radiate heat to outside, and so as to connect the pipes as indicated by an broken line in the drawing when it is required for the outdoor heat exchanger 3 to take heat away from outside. At this time, the first expansion device 6 of the outdoor heat exchanger 3 controls, for example, the degree of superheat (SH) of the refrigerant at the outlet of the outdoor heat exchanger when the outdoor heat exchanger 3 acts as an evaporator, and controls, for example, the degree of supercooling (SC) of the refrigerant at the outlet of the outdoor heat exchanger, the outlet temperature of the refrigerant in the outdoor heat exchanger 3, an intermediate pressure Pc, and the like when the outdoor heat exchanger 3 acts as a condenser, thereby controlling the amount of heat exchange of the outdoor heat exchanger 3.

[Diversion Controller B2]

The high-pressure pipe 52-1 is connected to first ends of the three-way valve 8-1 and the three-way valve 8-2, and further the low-pressure pipe 52-2 is connected to second ends of the three-way valve 8-1 and the three-way valve 8-2. Also, the intermediate heat exchangers 5-1 and 5-2 are connected to first ends of the expansion device 4-1 and the expansion device 4-2, and the middle-pressure pipe 52-3 is connected to second ends of the expansion device 4-1 and the expansion device 4-2. Although at least two intermediate heat exchangers are required for each of the plurality of indoor units C connected to the diversion controller B2 to perform cooling and heating, three or more intermediate heat exchangers may be mounted in the diversion controller B2, and fine control can be performed in accordance with the indoor load by connecting the respective elements so that the connection between the respective elements can be switched using a three-way valve.

Here, the movement of the refrigerant in the cooling operation, the heating operation, the cooling-main operation, and the heating-main operation executed by the air-conditioning apparatus 400 will be described. The operation of the brine is similar to that in Embodiment 3, and description thereof is thus omitted.

[Cooling Operation]

At the time of the cooling operation, the three-way valve 8-2 and the three way valve 8-3 are controlled so that the intermediate heat exchanger 5-1 and the intermediate heat exchanger 5-2 are connected to the low pressure portion $P_L$. The connection of the four-way valve 2 is switched so as to allow the refrigerant discharged from the compressor 1 to flow into the outdoor heat exchanger 3. At this time, the pressure of the refrigerant sucked into the compressor 1 is increased in the compressor 1, and the outdoor heat exchanger 3 exchanges heat between the refrigerant and the outside air to condense the refrigerant. The first expansion device 6, the expansion device 4-1 and the expansion device 4-2 reduce the pressure of this condensed refrigerant to obtain low-temperature and low-pressure two-phase refrigerant. The intermediate heat exchanger 5-1 and the intermediate heat exchanger 5-2 exchange heat between the refrigerant and water for cooling to obtain low-temperature and low-pressure gas refrigerant. The refrigerant returns to the compressor 1.

[Heating Operation]

At the time of the heating operation, the three-way valve 8-2 and the three way valve 8-3 are controlled so that the intermediate heat exchanger 5-1 and the intermediate heat exchanger 5-2 are connected to the high pressure portion $P_H$. The connection of the four-way valve 2 is switched so that the refrigerant in the outdoor heat exchanger 3 can be sucked into the compressor 1. The pressure of the refrigerant sucked into the compressor 1 is increased in the compressor 1, and the intermediate heat exchanger 5-1 and the intermediate heat exchanger 5-2 exchange heat between the refrigerant and the brine for heating to condense the refrigerant. The expansion device 4-1, the expansion device 4-2, and the first expansion device 6 reduces the pressure of the condensed refrigerant to obtain low-temperature and low-pressure two-phase refrigerant, and the outdoor heat exchanger 3 exchanges heat between the refrigerant and the outside air to obtain low-temperature and low-pressure gas refrigerant. The refrigerant returns to the compressor 1.

[Heating-Main Operation]

At the time of the cooling-main operation, the three-way valves 8 are controlled so that an intermediate heat exchanger 5 that produces hot water is connected to the high-pressure portion $P_H$ and an intermediate heat exchanger 5 that produces cold water is connected to the lower pressure portion $P_L$. The connection of the four-way valve 2 is switched in the same manner as in the cooling operation. The pressure of the refrigerant sucked into the compressor 1 is increased in the compressor 1, and is caused to branch into two routes. The outdoor heat exchanger 3 radiates heat excessively generated by the heating capacity, and, simultaneously, an intermediate heat exchanger 5 that produces hot water heats water. After that, the water in an intermediate heat exchanger 5 that produces cold water is cooled and returns to the compressor 1.

[Heating-Main Operation]

At the time of the heating-main operation, the three-way valves 8 are controlled so that an intermediate heat exchanger 5 that produces hot water is connected to the high-pressure portion $P_H$ and an intermediate heat exchanger 5 that produces cold water is connected to the lower pressure portion $P_L$. The connection of the four-way valve 2 can be switched in the same manner as in the heating operation. The pressure of the refrigerant sucked into the compressor 1 is increased in the compressor 1, and an intermediate heat exchanger 5-2 that produces hot water exchanges heat between the refrigerant and water for heating to condense the refrigerant. The condensed liquid refrigerant is caused to branch into two routes. Part of the refrigerant is reduced in pressure to decrease the temperature, flows into an intermediate heat exchanger 5 that produces cold water, and exchanges heat with water for cooling. The remaining part exchanges heat with the outside air in the outdoor heat exchanger 3, and returns to the compressor 1.

The air-conditioning apparatus 400 is configured as described above, and the number of connecting pipes is increased in comparison with Embodiment 3, but the flow control valve in the diversion controller B can be omitted. Also, in the air-conditioning apparatus 400 as well, each of the intermediate heat exchanger for cooling and the intermediate heat exchanger for heating can set and control the target value of the temperature difference based on Embodiment 1. Therefore, operation in a state of high COP can be achieved.

REFERENCE SIGNS LIST

1 compressor; 2 four-way valve; 3 outdoor heat exchanger; 3-*a* outdoor fan; 4 expansion devices; 4-1 expansion device; 4-2 expansion device; 4-3 expansion device; 5 intermediate heat exchangers; 5-1 first intermediate heat exchanger; 5-2 second intermediate heat exchanger; 6 first expansion device; 7 second expansion device; 8 heat source side three-way valve; 8-1 heat source side three-way valve; 8-2 heat source side three-way valve; 10 check valve block; 10-1 check valve; 10-3 check valve; 10-4 check valve; 10-5 first connecting pipe;
10-6 second connecting pipe; 11 pump; 11-1 first pump; 11-2 second pump; 12 indoor heat exchanger; 12-1 indoor heat exchanger; 12-2 indoor heat exchanger; 12-3 indoor heat exchanger; 12-*a* indoor fan; 12-1 *a* indoor fan; 12-2*a* indoor fan; 12-3*a* indoor fan; 13 use side three-way valve; 13-1 use side three-way valve; 13-2 use side three-way valve; 13-3 use side three-way valve; 14 two-way valve; 14-1 two-way valve; 14-2 two-way valve; 14-3 two-way valve; 15 use side three-way valve; 15-1 use side three-way valve; 15-2 use side three-way valve; 15-3 use side three-way valve; 21 discharge pressure detector; 22 suction pressure detector; 23 first refrigerant temperature detector; 23-1 first refrigerant temperature detector; 23-2 first refrigerant temperature detector; 24 second refrigerant temperature detector; 24-1 second refrigerant temperature detector; 24-2 second refrigerant temperature detector; 25 first brine temperature detector; 25-1 first brine temperature detector; 25-2 first brine temperature detector; 26 second brine temperature detector; 26-1 second brine temperature detector; 26-2 second brine temperature detector; 27 outdoor temperature detector; 28 indoor temperature detector; 28-1 indoor temperature detector; 28-2 indoor temperature detector; 28-3 indoor temperature detector; 29 third brine temperature detector; 29-1 third brine temperature detector; 29-2 third brine temperature detector; 29-3 third brine temperature detector; 30 fourth brine temperature detector; 30-1 fourth brine temperature detector; 30-2 fourth brine temperature detector; 30-3 fourth brine temperature detector; 31 control means; 31-1 control means; 31-2 control means; 31a memory; 50 bypass pipe; 50-1 bypass pipe; 50-2 bypass pipe; 50-3 bypass pipe; 51 on-off valve; 51-1 on-off valve; 51-2 on-off valve; 51-3 on-off valve; 52 gas-liquid separator; 52-1 high-pressure pipe; 52-2 low-pressure pipe; 52-3 middle-pressure pipe; 100 air-conditioning apparatus; 200 air-conditioning apparatus; 300 air-conditioning apparatus; 400 air-conditioning apparatus; A outdoor unit; A2 outdoor unit; B diversion controller; B1 diversion controller; B2 diversion controller; C indoor units; D parent diversion controller; E child diversion controller;

The invention claimed is:
1. An air-conditioning apparatus comprising:
a primary-side cycle including a compressor, a heat source side heat exchanger, a first expansion device, a second expansion device, a third expansion device, a fourth expansion device, a first intermediate heat exchanger, a second intermediate heat exchanger, a first flow switching valve and a second flow switching valve, all of which are connected in a closed loop allowing a primary-side heat transfer medium to circulate; and
a secondary-side cycle including a variable capacity pump configured to vary a flow rate of a secondary-side heat transfer medium continuously, a plurality of use side heat exchangers, the first intermediate heat exchanger and the second intermediate heat exchanger, all of which are connected in a closed loop allowing the secondary-side heat transfer medium to circulate, wherein the secondary-side heat transfer medium is different from the primary-side heat transfer medium, and contains at least either one of brine and water,
the first and the second intermediate heat exchangers exchanging heat between the primary-side heat transfer medium and the secondary-side heat transfer medium,
wherein the plurality of use side heat exchangers are connected to a single outdoor unit, an operation mode of each of the use side heat exchangers being freely selectable between cooling and heating,
the compressor and the heat source side heat exchanger are provided in the outdoor unit,
the plurality of use side heat exchangers are provided in a plurality of indoor units, respectively,
a control valve controlling the flow rate of the secondary-side heat transfer medium supplied to the first and second intermediate heat exchangers and the plurality of indoor units is provided in a relay unit, the relay unit being a separate enclosure from the indoor units and the outdoor unit,
heat transport from the outdoor unit to the relay unit is performed using the primary-side heat transfer medium and heat transport from the relay unit to the indoor units is performed using the secondary-side heat transfer medium,
wherein the secondary-side cycle further comprises a first temperature detector and a second temperature detector of the secondary-side heat transfer medium provided before and after each of the first and second intermediate heat exchangers, respectively,
wherein a passage of the primary-side heat transfer medium provided to the relay unit includes a first branch portion branching the primary-side heat transfer medium at high pressure, a second branch portion branching the primary-side heat transfer medium at low pressure and a third branch portion branching the primary-side heat transfer medium at intermediate pressure, the intermediate pressure being lower than the high pressure,
wherein the third expansion device connects the first branch portion and the third branch portion, and the fourth expansion device connects the third branch portion and the second branch portion,
wherein a first end of the first intermediate heat exchanger is connected to the first flow switching valve and a second end of the first intermediate heat exchanger is connected to the first expansion device, the first flow switching valve selectively connects the first end of the first intermediate heat exchanger to the first branch portion and to the second branch portion,
wherein a first end of the second intermediate heat exchanger is connected to the second flow switching valve and a second end of the second intermediate heat exchanger is connected to the second expansion device, the second flow switching valve selectively connects the first end of the second intermediate heat exchanger to the first branch portion and to the second branch portion,
wherein during a cooling mode, the primary-side heat transfer medium flows in an order of the first branch portion, the third expansion device and the third branch portion, then is divided into a first stream and a second stream, the first stream flows in an order of the first expansion device, the first intermediate heat exchanger, and the first flow switching valve, the second stream flows, in parallel with the first stream, in an order of the second expansion device, the second intermediate heat exchanger, and the second flow switching valve, and then the first stream and the second stream merge and flow out from the relay unit via the second branch portion,
wherein during a heating mode, the primary-side heat transfer medium flows into the first branch portion, then is divided into a third stream and a fourth stream, the third stream flows in an order of the first flow switching valve, the first intermediate heat exchanger, and the first expansion device, and the fourth stream flows, in parallel with the third stream, in an order of the second flow switching valve, the second intermediate heat exchanger, the second expansion device, and then the third stream and the fourth stream merge at the third branch portion, flow through the fourth expansion device and flow out from the relay unit via the second branch portion, the air-conditioning apparatus further comprises a controller for setting a target value of the difference between the temperatures of the secondary-side heat transfer medium at a position before and at a position after the first and second intermediate heat exchangers based on whether the operation mode is the heating mode or the cooling mode, and for controlling the flow rate of the secondary-side heat transfer medium flowing in the first and second intermediate heat exchangers such that the difference between the temperatures of the secondary-side heat transfer medium at the position before and at the position after the first and second intermediate heat exchangers detected by the first temperature detector and the second temperature detector will correspond to the target values in both the heating and cooling operations, by adjusting the capacity of the pump, wherein the controller sets the target value of the difference between the temperatures of the secondary-side heat transfer medium at the position before and at the position after the first and second intermediate heat exchangers during a rated operation in the heating operation so as to have a larger magnitude than the target value of the difference between the temperatures of the secondary-side heat transfer medium at the position before and at the position after the first and second intermediate heat exchangers during a rated operation in the cooling operation.

2. The air-conditioning apparatus of claim 1, wherein in the heating operation, a target value of a degree of supercooling of the primary-side heat transfer medium at an outlet of the first and second intermediate heat exchangers is set to be equal to or lower than the difference in magnitude between the inlet and outlet temperatures of the secondary-side heat transfer medium at the position before and at the position after the first and second intermediate heat exchangers, and the expansion devices are controlled based on a degree of supercooling of the primary-side heat transfer medium at an outlet of the first and second intermediate heat exchangers and the target value of the degree of supercooling.

3. The air-conditioning apparatus of claim 1, wherein the target value of the difference in magnitude between the temperatures of the secondary-side heat transfer medium at the position before and at the position after the first and second intermediate heat exchangers is set according to the magnitude of a load on the use side heat exchanger.

4. The air-conditioning apparatus of claim 3, wherein the target value of the difference in magnitude between the temperatures of the secondary-side heat transfer medium in a case where a load on the use side heat exchanger is equal to or lower than a predetermined load is set so as to be equal to or lower than a target value of the difference in magnitude between the temperatures of the secondary-side heat transfer medium in a case where the load on the use-side heat exchanger is larger than the predetermined load.

5. The air-conditioning apparatus of claim 1, further comprising:

an outdoor unit side control device that controls each device accommodated in the outdoor unit; and a relay unit control device that controls respective devices accommodated in the relay unit and that is capable of communicating with the outdoor unit side control device, wherein a control signal including data on load information of the indoor units and/or a target value of the difference in magnitude between the temperatures of the secondary-side heat transfer medium and/or a target value of the degree of supercooling of the primary-side heat transfer medium at an outlet of the first and second intermediate heat exchangers or an adjustment value of the control target value is transmitted from the relay unit control device to the outdoor unit side control device or from the outdoor unit side control device to the relay unit control device.

6. The air-conditioning apparatus of claim 1, wherein each of the intermediate heat exchangers is installed in series with respect to the flow of the primary-side heat transfer medium and in parallel with respect to the flow of the secondary-side heat transfer medium, the differences in magnitude between the inlet and outlet temperatures of the secondary-side heat transfer medium in the respective intermediate heat exchangers are controlled to be identical at the time of a cooling operation, and the difference in magnitude between the inlet and outlet temperatures of the secondary-side heat transfer medium in the first and second intermediate heat exchangers on the upstream side with respect to the flow of the primary-side heat transfer medium is controlled to be equal to or larger than the difference in magnitude between the inlet and outlet temperatures of the secondary-side heat transfer medium in the first and second intermediate heat exchangers on the downstream side with respect to the flow of the primary-side heat transfer medium at the time of a heating operation.

7. The air conditioning apparatus of claim 1, wherein the first and second intermediate heat exchangers are used as a condenser of the primary-side heat transfer medium, and the primary-side heat transfer medium and the secondary-side heat transfer medium flowing in the first and second intermediate heat exchangers flow in a counter-flow manner.

8. The air-conditioning apparatus of claim 1, wherein a heat medium having a critical temperature of 50 degrees C. or lower is used as the primary-side heat transfer medium.

9. The air-conditioning apparatus of claim 1, wherein the target value of the difference between the temperatures of the secondary-side transfer medium in a case where a distance from the pump to the use-side heat exchanger is not longer than 10 m is set in a range of 3 through 7 degrees C. at the time of a cooling operation or 5 through 15 degrees C. at the time of a heating operation.

10. The air-conditioning apparatus of claim 1, wherein the target value of the difference between the temperatures of the secondary-side transfer medium in a case where a distance from the pump to the use-side heat exchanger is 40 m or longer is set in a range of 7 through 9 degrees C. at the time of a cooling operation or 10 through 20 degrees C. at the time of a heating operation.

11. The air-conditioning apparatus of claim 1, wherein, the primary-side cycle and the secondary-side cycle are configured so that, at the time of cooling operation, the primary-side heat transfer medium and secondary-side heat transfer medium flow through the first and second intermediate heat exchangers in a parallel-flow manner or a counter-flow manner and at the time of the heating operation, the primary-side heat transfer medium and secondary-side heat transfer medium flow through the first and second intermediate heat exchangers in the counter-flow manner.

12. The air-conditioning apparatus of claim 1, wherein,
during a simultaneous cooling and heating operation in which at least one indoor unit operates in the cooling mode and another at least one indoor unit operates in the heating mode, the primary-side heat transfer medium flows into the first branch portion, then flows in an order of the second flow switching valve, the second intermediate heat exchanger and the second expansion device to heat the secondary-side heat transfer medium at the second intermediate heat exchanger, then flows in an order of the third branch portion, the first expansion device, the first intermediate heat exchanger and the first flow switching valve to cool the secondary-side heat transfer medium at the first intermediate heat exchanger and then flows out from the relay unit via the second branch portion,
the controller is configured to set the target value of the difference between the temperatures of the secondary-side heat transfer medium at the position before and at the position after the intermediate heat exchangers connected to the indoor unit operating in the heating mode so as to have a larger magnitude than the target value of the difference between the temperatures of the secondary-side heat transfer medium at the position before and at the position after the intermediate heat exchangers connected to the indoor unit operating in the cooling mode.

* * * * *